US006946771B2

(12) United States Patent
Cros et al.

(10) Patent No.: US 6,946,771 B2
(45) Date of Patent: Sep. 20, 2005

(54) POLYPHASE CLAW POLE STRUCTURES FOR AN ELECTRICAL MACHINE

(75) Inventors: Jerôme Cros, Sainte-Foy (CA); Philippe Viarouge, Sainte-Foy (CA)

(73) Assignee: Quebec Metal Powders Limited, Quebec (CA)

(*) Notice: Subject to any disclaimer, the term of this patent is extended or adjusted under 35 U.S.C. 154(b) by 112 days.

(21) Appl. No.: 10/192,030

(22) Filed: Jul. 10, 2002

(65) Prior Publication Data

US 2004/0007936 A1 Jan. 15, 2004

(51) Int. Cl.⁷ .......................... H02K 19/00; H02K 1/12; H02K 1/22
(52) U.S. Cl. .................. 310/257; 310/263; 310/198
(58) Field of Search ................... 310/263, 257, 310/49 A, 49 R, 54, 164

(56) References Cited

U.S. PATENT DOCUMENTS

| | | | |
|---|---|---|---|
| 4,882,515 A | 11/1989 | Radomski | 310/263 |
| 5,854,526 A | 12/1998 | Sakamoto | 310/254 |
| 6,028,377 A | * 2/2000 | Sakamoto | 310/49 R |
| 6,441,518 B1 | * 8/2002 | Yockey et al. | 310/58 |
| 6,495,941 B1 | * 12/2002 | Nishimura | 310/184 |
| 6,512,314 B1 | * 1/2003 | Nakanishi | 310/49 R |

FOREIGN PATENT DOCUMENTS

| | | |
|---|---|---|
| DE | 199 10 554 A | 9/2000 |
| WO | WO 01 31766 A | 5/2001 |
| WO | WO 03 026106 A | 3/2003 |

* cited by examiner

Primary Examiner—Burton S. Mullins
Assistant Examiner—Heba Elkassabgi
(74) Attorney, Agent, or Firm—Fitzpatrick, Cella, Harper & Scinto

(57) ABSTRACT

A magnetic circuit component having a plurality of claws arranged in a plurality of rows, with the base of each claw connected to a common yoke. A plurality of non-interlaced coils constituting a multi-phase winding are included, with the coils being wound around the bases of corresponding claws, and being distributed uniformly in the direction of motion.

40 Claims, 42 Drawing Sheets

410

POLYPHASE CLAW POLE STRUCTURES FOR AN ELECTRICAL MACHINE

BACKGROUND OF THE INVENTION

The invention relates to electric machinery. In particular, this invention relates to the design of claw pole structures for polyphase electrical machinery.

Electric machinery makes use of a changing magnetic field to produce either an electrical current or a mechanical force. In the case of electric machinery adapted to produce an electrical current, a magnetic field is passed over a wire coil, which induces the desired electrical current in the wire coil. In the case of electrical machinery used to produce a mechanical force, an electric current is passed through a wire coil, which causes the coil to be attracted to (or repelled by) an adjacent magnetic field, thereby yielding the desired force.

The foregoing principles are commonly implemented in rotating electrical machinery. For example, in an electric generator or alternator, a rotating element, or rotor, is passed through the magnetic field produced at intervals by a stator, which has a number of poles arranged around the direction of rotation to provide the magnetic field (which can be generated electromagnetically). An electric motor can have a similar structure; the only difference in principle being that electric current is provided to the rotor coils, rather than being (in the case of a generator or alternator) generated by the rotor coils.

The geometrical design and composition of the stator poles affects the efficiency of operation, as well as the size, shape and weight of the electric machine. A claw-type structure is frequently used for the rotor poles of electrical machines having a single centralized winding or coil. In the case of alternator rotors, the coil is fed by a D.C. current. In other applications, such as in asynchronous motors, stepper motors and brushless permanent magnet motors, the stator coil is fed either by an A.C. current or by impulsions.

The use of laminated materials has constrained the armature geometries of polyphase electrical machines. Typically, the magnetic circuit is constructed by stacking identical laminations one on top of the other, which are electrically isolated from each other to avoid the circulation of eddy currents. These armature geometries are invariant along the axis of rotation. Also, because the magnetic flux circulates in the plan of the laminations, they can be referred to as 2D structures.

The assembly of electrical machines which use a stack of laminations usually requires several additional mechanical parts. For example, it is necessary to add flanges on each opposite side of the lamination stack to support the bearing housings, which perform the function of fixing the rotor to the stator. The assembly of these flanges to the stack is made more difficult by the nature of the laminations and by the presence of the end-windings, which extend out of the slots. These flanges must be distal from the end-windings in order to minimize the flux leakage, if they are made of a magnetic material, or the eddy currents, if they are made of a conductive material. These assemblies usually increase the total axial length of the machine.

Heat dissipation is also a critical problem in the machine structures which use laminated materials, because the heat transfer is much less efficient in the direction perpendicular to the plan of the laminations. Cooling systems, such as an external extruded aluminium yoke equipped with cooling fins, are usually press-fit around the lamination stack to try to improve heat transfer to the ambient atmosphere, but the efficiency of such cooling systems is limited by their poor thermal contact with the laminations. All these problems explain the relatively high number of heterogeneous parts which are necessary in a conventional electrical machine to perform the electromagnetic, mechanical and thermal functions, and which increase its material and assembly cost: windings, laminations, flanges, bearing housing supports, fixing screws and rods, external yoke, aluminium fins, etc.

It is possible to make portions of an electrical machine with an isotropic magnetic material, such as soft magnetic composites made of iron powder. Cooling fins made of the same magnetic material also can be integrated in the magnetic circuit parts. (CA Pat. 2282636 December 1999). It is also known that claw-pole structures present several advantages in low power applications. An example of an electrical machine using a high number of claw-poles are the "canned motors" used in timers or car alternators, which use a claw pole rotor (U.S. Pat. No. 3,271,606 et U.S. Pat. No. 3,714,484). However, this configuration is generally applied to single-phase machines, which use only one coil that is embedded in a magnetic circuit made of two parts equipped with claws. This kind of arrangement is called a "centralized winding". A centralized winding may be easier to realize than other winding configurations because the total number of coils is generally equal to the number of phases of the motor.

In the case of the inductor of a car alternator, the coil is fed by a DC current. Other applications, such as the stators of asynchronous motors (U.S. Pat. No. 3,383,534), stepper motors (U.S. Pat. No. 5,331,237) and brushless permanent magnet motors (U.S. Pat. No. 5,854,524), illustrate the use of claw-pole structures where the coil is fed either by an AC current or by current pulses.

FIGS. 1A, 1B and 1C show several views of a prior art magnetic circuit component 100; a single phase stator structure. This structure has a yoke 105 (FIG. 1B) that is formed from a magnetic material. The yoke 105 is made from two opposing annuli, 110, 120, with projecting fingers, or claws 112, 114, 116, 122, 124, 126 extending radially inwardly to front along the air gap next to the surface of the rotor (not shown). An annular coil 130 is arranged in the axial direction, concentric with the rotor axis (not shown), surrounded by the two annuli 110, 120 of the magnetic circuit. The plane defined by the coil is perpendicular to the surface of the air gap between the stator and the rotor. The magnetic flux produced by annular coil 130 passes through the air gap to the rotor via the claws 112, 114, 116, 122, 124, 126 on each side of the coil 130.

In the case of an AC claw-pole armature, it is preferable to realize the core with a composite magnetic material to minimize the eddy current losses (U.S. Pat. Nos. 3,383,534 and 5,331,237). One can also use an assembly of magnetic sheets, or laminations, and other parts made from iron-powder materials, produced by powder metallurgy methods (U.S. Pat. Nos. 6,320,294, 6,201,324).

The implementation of a polyphase structure with a claw-pole armature is usually more difficult. It is necessary to stack several single-phase structures placed on the stator or the rotor and separate them by air gaps to avoid magnetic short circuits and performance degradations. However, in the case of small-power motors, such as stepper motors, one can often tolerate this kind of degradation of performance by directly juxtaposing several single-phase structures without adding air gaps between the structures (U.S. Pat. Nos.

6,259,176 6,031,304). U.S. Pat. No. 5,854,526 illustrates a three-phase, claw-type structure using a different arrangement of the coils. Three coils are placed in the same plan, with their axes parallel to the surface of the air gap between the stator and the rotor. As in the case of the preceding structures, the plan defined by the coils is perpendicular to the air gap surface. However, these structures do not solve the problems of magnetic short circuits and should only be used in applications with a very small power.

SUMMARY OF THE INVENTION

This invention concerns different structures of polyphase claw-pole armatures for an electrical machine and their associated assembly methods. These structures can be used for the design and construction of the stators of polyphase electrical machines (motors and alternators), fed by AC or pulse currents such as synchronous and permanent magnet machines, stepper motors, asynchronous machines and reluctance machines, covering a large power range. These polyphase structures can also be used for the design of the rotor armatures of DC machines (motors or generators).

In these machines, the air gap surface is either planar, in the case of linear movement, or cylindrical, in the case of circular movement. To simplify the following description, we will only consider the armature magnetic circuits. The figures present structures with a cylindrical air gap surface only and with a circular motion around the axis of the air gap surface. However, the same structures can also be used for the rotor of other kinds of electrical machines like DC machines. One can also have planar air gap surfaces with either a linear motion or a circular motion around an axis perpendicular to the air gap surface.

As in the case of previous claw-pole structures, the magnetic circuit surrounds the coil and it can be divided in several sections to facilitate its assembly with the coil. This magnetic circuit is equipped with several rows of claws, facing the air gap of the rotor. The claws (or fingers) of two adjacent rows are interlocked (or interspaced) to cover a larger surface of the air-gap without increasing the axial space taken up. The present invention differs from previous efforts in the proposed arrangement of coils and claws over different parts of the magnetic circuits. The coils are wound around the bases of certain claws. The base of a claw forms the part of the magnetic circuit which is perpendicular to the surface of the air gap. Several claws can be attached to a single claw base. The bases of all claws in the same row are connected to a common yoke. The axes of the coils are always perpendicular to the surface of the air-gap; that is to say, the plan defined by the coils is parallel to the surface of the air-gap. The coils are not interlocked and are spaced regularly along the axis of motion. With this structure, the magnetic flux produced by the rotor poles circulates alternatively in the three directions in the core and in the claws without a DC component.

All the claws do not necessarily have the same dimensions either in a given row or in adjacent rows. The shape of the claws allows one to adjust the harmonic content of the electromotive force and to control the amplitude of the cogging torque. Different shapes of the claw part facing the air-gap can also be considered, according to the specifications and the constraints of the application. The most common shapes are rectangular, triangular or trapezoidal. One can also skew the claws tangentially to the air-gap surface, in the direction of motion, to reduce the cogging torque by using the same skewing method used in conventional machines. The thickness of the air-gap between rotor and stator can also vary along the surface of the same claw. With such an approach, the spatial distribution of the induction in the air-gap and the distribution of the induction in different parts of the claw can be precisely adapted.

The bases of the claws that support the coils generally have a rectangular shape. Nevertheless, it is preferable to round the corners to simplify winding. In some cases, one can also use oval or circular shapes to minimize the size of the coils.

The magnetic circuit is preferably made out of a metal-power based, composite magnetic material, formed by pressing, molding or machining. Some parts of the magnetic circuit can also be made of conventional lamination stacks. In special cases, where the coil assembly on the core is difficult, it is possible to split the magnetic circuit in several assembled parts to facilitate the mounting of the coils. Subsequently, the mechanical assembly can be carried out by gluing, screwing or pressing these individual parts together.

The claw-pole armatures of this invention can be used with a classic cylindrical rotor; for example, a rotor made with permanent magnets mounted on the surface of a yoke. However, it is recommended to use two rotor yokes equipped with magnets and separated by an axial air-gap. With this arrangement, each magnet row can be correctly positioned in relation to the stator claws. In this case, the claws of the central and lateral parts can have identical thicknesses. This division of the rotor into several rows can also be used to smooth the cogging torque if the magnet rows are slightly shifted with a suitable angle.

The claw-poles structure presented in this invention offers a better integration of the electromagnetic, mechanical and thermal functions than the classical laminated structure. In the case where a composite metal powder is used, the iron flakes are isolated by a resin, and the magnetic flux can circulate in all directions, or in three dimensions, without an increasing magnetic losses. The new topologies and assemblies of the magnetic circuit realized by the present invention can improve the production process and reduce its cost. In such structures, it is possible to eliminate the mechanical fixing problem of the conventional stack of laminations and to minimize the size and the number of additional parts.

In the present invention, the magnetic circuit can be divided in several parts corresponding to each row of claws, which facilitates the assembly of the coils. In the case of a magnetic circuit divided into three parts, the mechanical fixation of the central part is performed by the lateral parts, which play the role of classical flanges. The winding can be also simplified by a minimization of the number of coils and the number of terminal connections. The total axial length of the machine is then reduced, and the volume of active materials and the winding production process and cost are minimized. The winding in the present invention is perfectly enclosed in the armature magnetic core. There are no winding parts which make the stator axial length greater than the active length of the magnetic circuit, like the end-windings in a classical 2D structure.

Furthermore, in the present invention the rotor can be secured very easily with small flanges that include the bearing housing. These small flanges can be made with a conductive material because the flux leakage of the end-windings is minimized, and they can be easily secured on the lateral parts. The mechanical fixing problem of the conventional stack of laminations with extended end-windings is eliminated.

While different magnetic circuit parts are generally used for the circulation of flux and the securing of the coils, in the present invention these parts can also be used for the simplification of the mechanical assembly and for fixation of position sensors. Furthermore, the size of the additional parts which are necessary for the bearing housings, and for mechanically securing the rotor, can be greatly reduced. Integration of the bearing housings in the lateral parts of the armature structures in this invention can be readily realized with a metal powder material. With this arrangement, each lateral part of the proposed magnetic circuit including the rotor bearing supports can be compacted in a single pressing operation. However, this integration must avoid any undesirable magnetic short circuit of the machine air-gap. This can be readily accomplished by using a non magnetic material to integrate the bearing housings in the lateral stator parts. Alternatively, it is also possible to use a magnetic material if specific conditions are respected. For example, in a periodic structure two different claws which present the same value of magnetic potential can be connected without any modification of the flux paths.

It is also easy to equip the structures of the present invention with a cooling system, with efficient natural or forced air convection or water circulation. This system can be totally integrated in the magnetic circuit parts, with or without using another kind of material. For example, the cooling fins and armature yoke can be compacted in a single pressing operation, with the cooling fins distributed around the outer surface of the yoke. If these fins are made with a composite magnetic material and oriented along the axial length of the machine, the magnetic flux can also circulate in them: they are "magnetically active". With such an arrangement the total size and weight of the motor is still minimized and the torque to weight ratio of the machine is increased. A fluid circulation cooling system can be also easily integrated in such structures. For example, it is possible to install pipes or passages for the circulation of the cooling fluid, which can be non-magnetic, and which can be directly in contact with the winding coils and arranged in a plan parallel to the rows of claws. These pipes are secured mechanically by the claws of the lateral parts. Channels for the circulation of the cooling fluid can be also directly realized in the yokes of the magnetic circuit made of soft magnetic material.

When it is necessary to design different motors to cover a specific power range, it is possible with the present invention to use identical parts to optimize the production process. In the case of a laminated material, the modification of the axial magnetic circuit length is used for this purpose, by adjusting the number of identical laminations to stack. It is possible to use the same approach in the case of the claw-pole armatures presented in this invention. It is always possible to directly stack two identical structures along the axis of rotation, without separating them by an air-gap. This transformation doubles the power of the initial machine. This assembly is very simple and it avoids the use of additional parts. The mechanical fixation is realized by the lateral parts of each structure and the windings can be connected in series or in parallel. One can then use a single inductor structure to cover the whole length of the motor, but it is also possible to use several stacked rotor yokes. In addition, one can also use a slight angular displacement between each structure in the direction of rotation. The oscillations of the cogging torque can thereby be minimized, and the harmonic content of the electromotive forces can be filtered out.

DESCRIPTION OF THE PREFERRED EMBODIMENTS

The embodiments of the present invention will be described in detail with reference to FIGS. 2A through 19B.

The electrical machine armature in this invention comprises a magnetic circuit component having one or more pieces and a polyphase winding with several coils. (FIGS. 2–12). The magnetic circuit component is preferably made from an iron-powder based composite magnetic material formed by pressing, molding or machining.

In this regard, it is not desirable to realize completely the magnetic circuit with a laminated material. Indeed, the circulation of an alternate magnetic flux in—three dimensions generates eddy currents in the sheets. However, it is possible to divide the magnetic circuit into several parts. The parts in which magnetic flux does not circulate in a plan (claws, corners) would be realized with a composite magnetic material, and the other parts in which the flux circulates in a plan (yoke, the bases of the claws) optionally could be made with a laminated material. While the mechanical assembly of the magnetic circuit becomes more complex, it can be accomplished by gluing, screwing or pressing the pieces together.

The magnetic circuit component is equipped with a number of rows of claws (FIGS. 2–12), positioned so that the top surfaces of the claws face the air gap between the stator and the rotor. These rows of claws are parallel to one another, and each row follows the direction of motion. The base of a claw forms part of the magnetic circuit, and the claws are connected to an annular yoke common to each row of claws. A winding is wound around the base of certain claws. Generally, the number of claws composing each row is a multiple of the number of phases of the electrical machine, although the number of claws can differ from one row to another. The distribution of the claws can either be regular (FIGS. 2–6), or irregular (FIGS. 7–11). The top surface of each claw adjacent the air gap has a greater surface area than the cross-section of the base of the claw (the portion of the claw distal from the air gap). This allows each claw to cover a larger surface of the air gap, while at the same time reducing the amount of metal required to form the claw pole and providing a location for a wire winding. The profile of the claws directly influences the harmonic content of the no-load electromotive force (emf) and the amplitude of the cogging torque. The most appropriate shapes for the top surfaces of the claws are rectangular, triangular or trapezoidal.

The polyphase, claw-pole armatures of the present invention can be used with rotors or stators which produce magnetic poles, alternatively magnetized North-South, in the direction of motion. These poles generate a magnetic flux circulating alternatively in the three dimensions of the magnetic circuit, the claws and the coils. This flux contains no DC component.

Figure 1A:
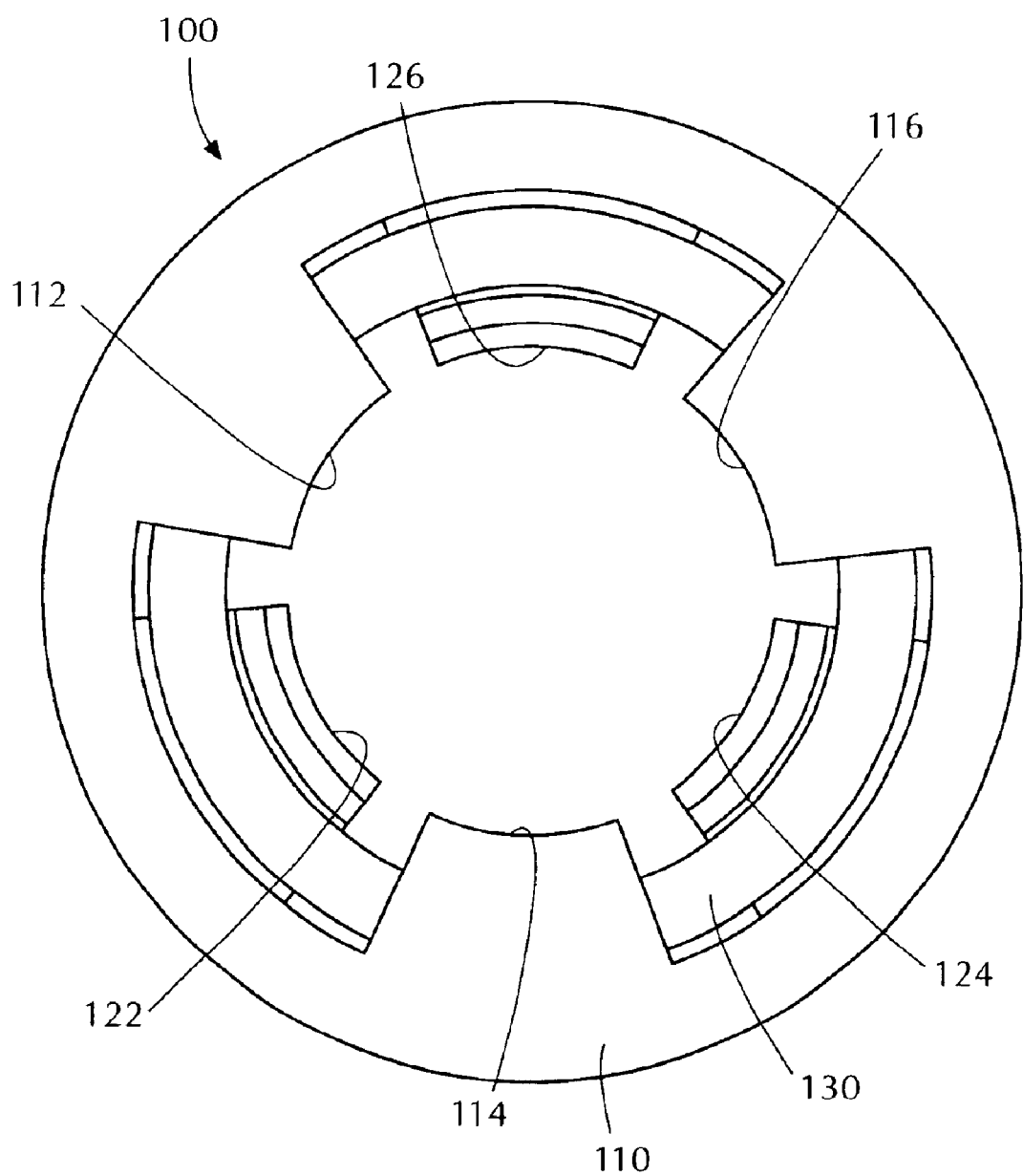
FIGS. 1A, 1B and 1C respectively depict front, assembled and exploded views of a prior art, single-phase, claw-pole structure with two sections and a central annular coil.
Figure 1B:
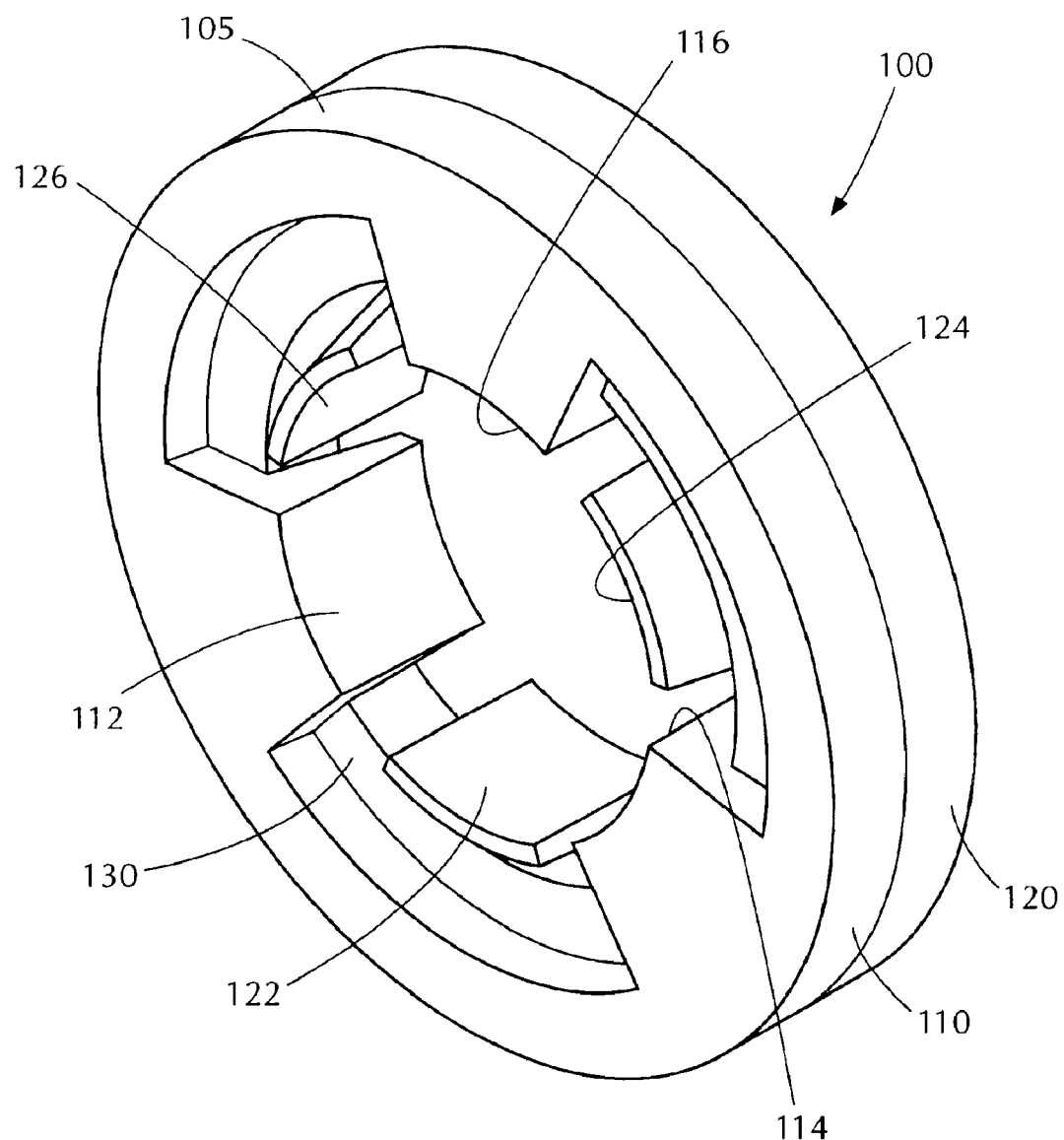
Figure 1C:
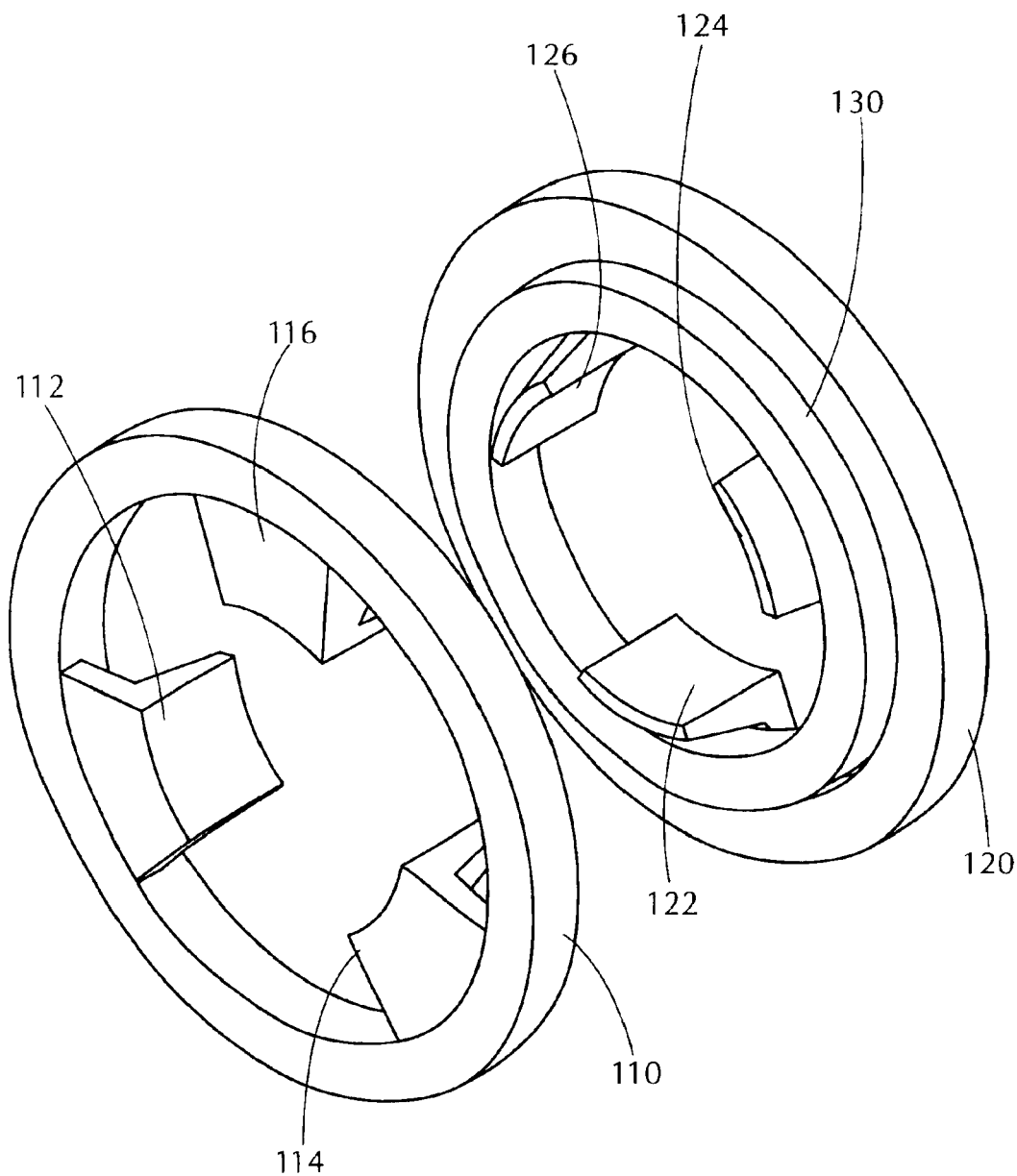
Figure 2A:
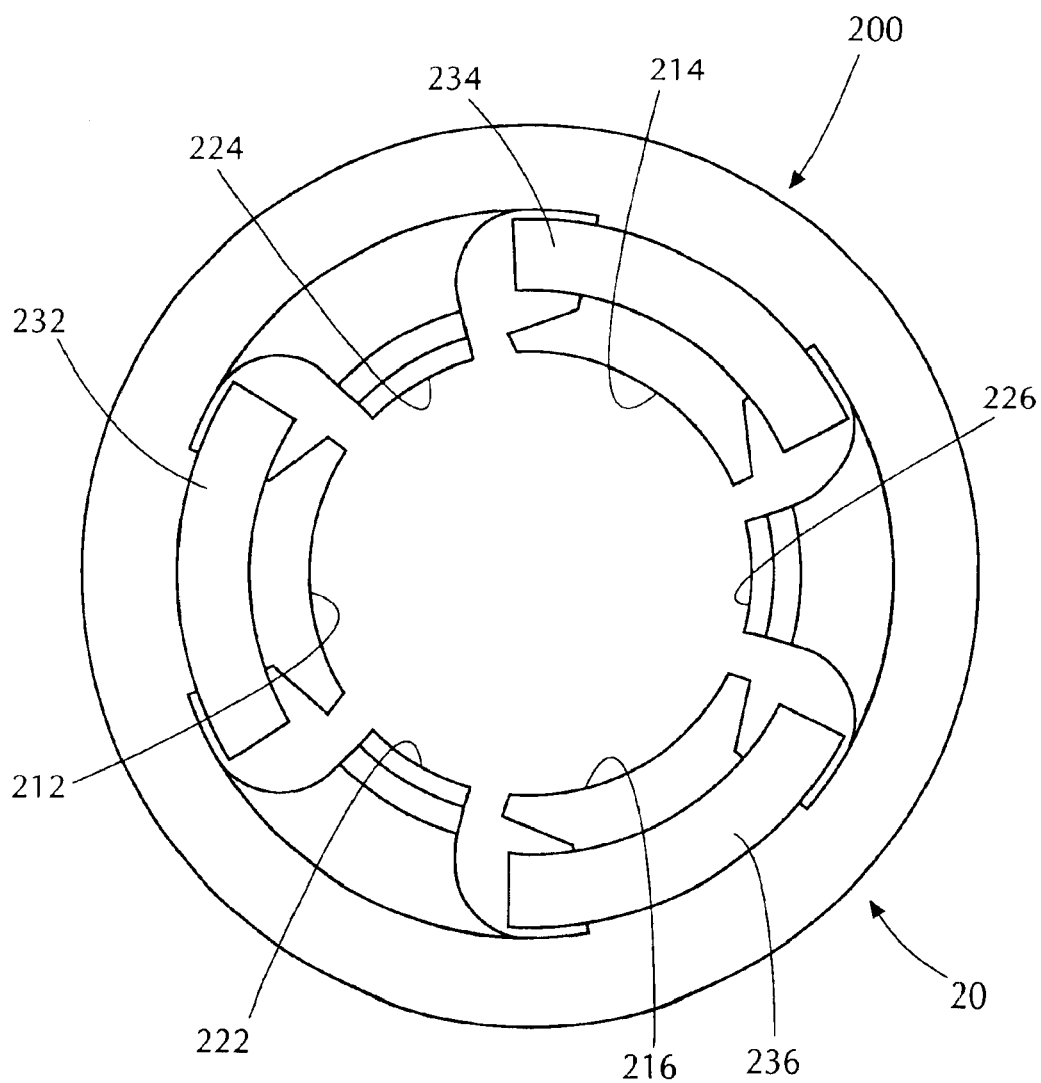
FIGS. 2A, 2B and 2C respectively depict front, assembled and exploded views of a simplified, three-phase, claw-pole magnetic circuit component based on the present invention, wherein the component is divided into two sections and three coils are mounted on the claws of one section.
Figure 2B:
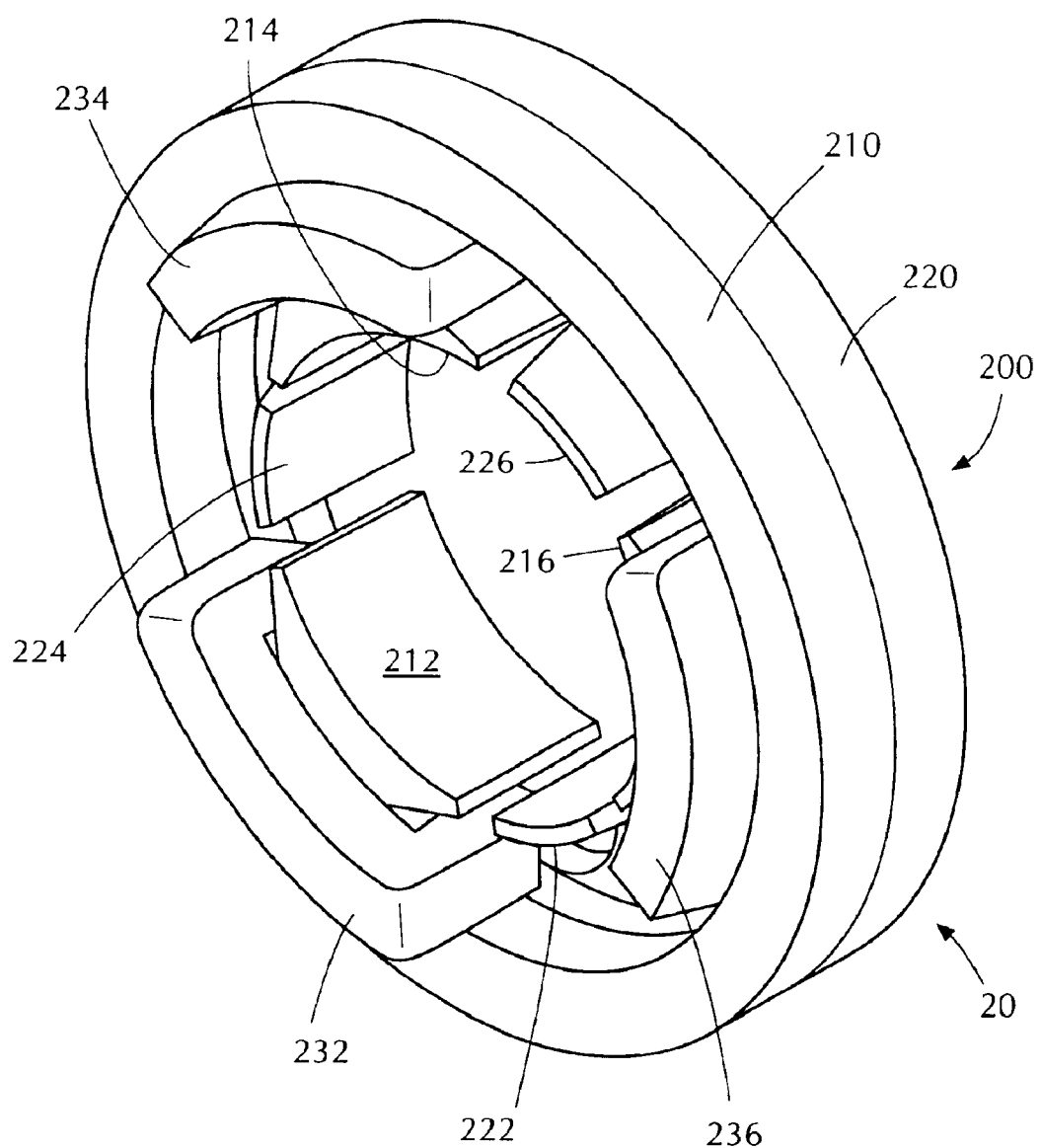

Normally, the claws of two adjacent rows are interlaced, or interspaced, to minimize the total axial length of the motor, whilst still covering the same air gap surface (see arrangement of claws 212, 214, 216 and 222, 224 and 226 in FIG. 2B). However, when the distance between claws becomes too small, magnetic flux leakage become significant. It is therefore preferable to interlace the claws only to the degree that flux leakage does not become significant, in view of the particular application and design requirements.

In the practice of the present invention, it is not necessary that successive rows of claws have either the same shape or the same width (see claws 212, 214, 216 and 222, 224 and 226 in FIG. 2). However, alternate rows of claws (i.e., two claw rows separated by a third claw row) always have the same shape (FIGS. 3–12). Normally, claws situated on adjacent rows on either side of one row are aligned in a direction perpendicular to the rows of claws (FIGS. 3–12). They are then at the same magnetic potential and can either touch or be separated by a small air gap without engendering any magnetic flux leakage (FIGS. 3–12).

As indicated above, the magnetic circuit component of the present invention incorporates one or more wire coils, connected either in series or in parallel, to generate the magnetic field in the claws. Each coil is wound directly around the base of one (FIGS. 2–6) or several claws (FIGS. 7–11). The coils are always spaced regularly along the axis of motion and are not interlaced. The plan defined by the coils is always parallel to the direction of motion and the air gap between the stator and the rotor (FIGS. 2–12). In the case of embodiments employing a number of claw rows, the coils are mounted entirely on the bases of the even rows, or the odd rows, but not intermixed.

While the present invention embraces structures with two rows of claws (FIG. 2), in most cases it is preferable to have at least three rows of claws (FIGS. 3–12). FIG. 2 shows an outer armature for a three phase machine with two rows of claws (a first row of claws 212, 214 and 216 on annulus 210 and a second row of claws 222, 224 and 226 on annulus 220), which can be employed either as a rotor or a stator. It is preferred for best performance to utilize this structure with a corresponding inductor (rotor or stator) producing four magnetic poles in the air gap.

As explained above, the embodiments described herein generally have a cylindrical geometry. For convenience of reference, the direction co-linear with the axis of revolution of the structures described herein shall be referred to as the axial direction; the direction defined by a point rotating about the axis of revolution shall be referred to as the circumferential direction; and the direction normal to the axis of revolution shall be referred to as the radial direction.

FIG. 2 illustrates magnetic circuit component 20, which has a yoke 200. A number of claw poles (discussed below) extend in a radially inward direction from the yoke. When component 20 is in use, the top surfaces of these claw poles are spaced from a corresponding generally cylindrical electrical component (not shown) located within their periphery, thus to define an air gap between the two components.

Figure 2C:
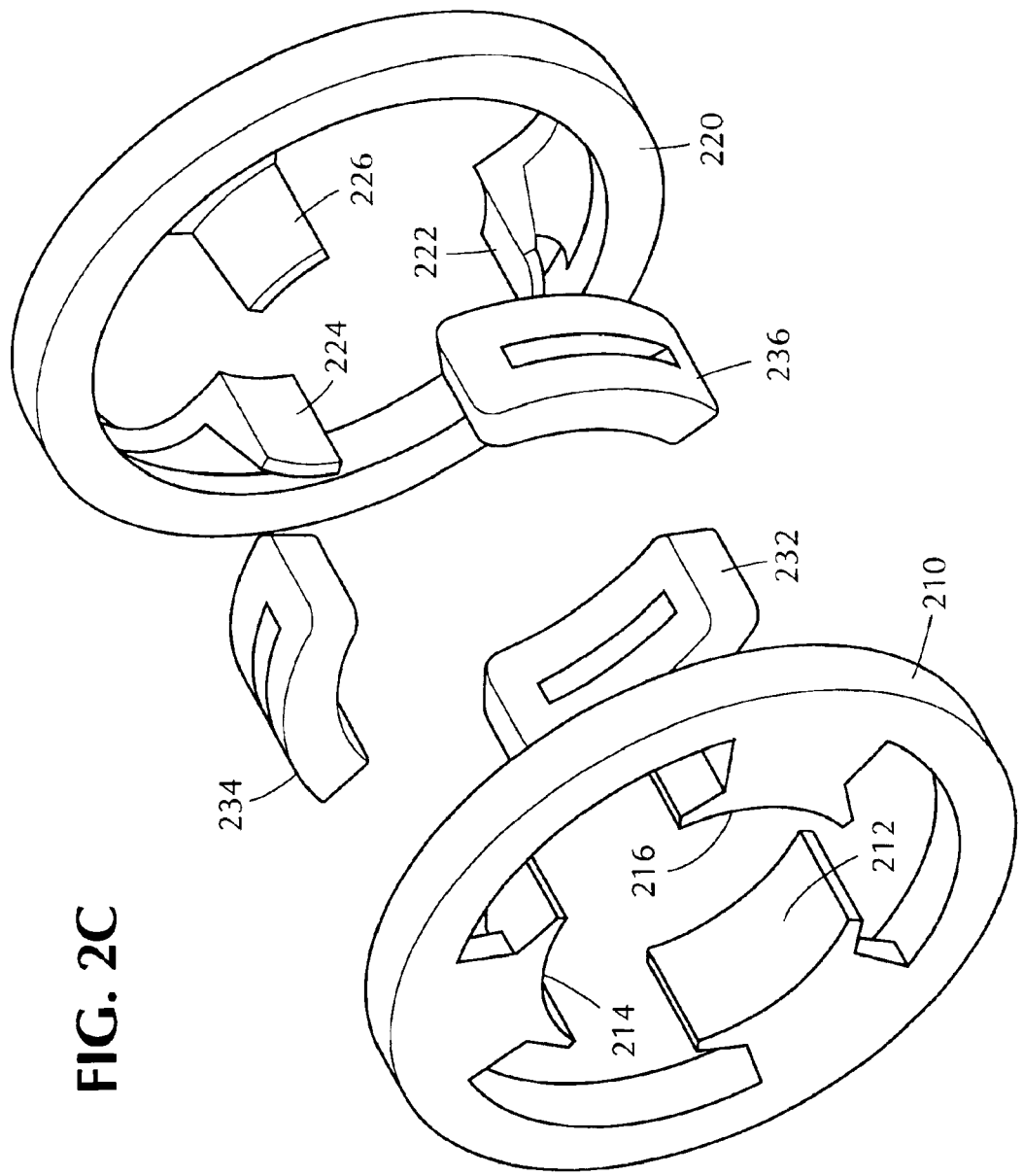

As shown in FIGS. 2B and 2C, yoke 200 is divided into two parts, annuli 210, 220. This division of yoke 200 is defined by a plane perpendicular to the cylindrical surface defined by the air gap. In the embodiment of FIG. 2, each annulus 210, 220 is equipped with a row of three claws, 212, 214, 216 and 222, 224 and 226, which are regularly spaced around the circumference of their respective annulus. The dimensions of the top surfaces of the claws on each annulus differ; in this embodiment, the area of the top surfaces of claws 212, 214 and 216 is larger than the area top surfaces of claws 222, 224 and 226. This is because the circumferential dimension of claws 212, 214 and 216 is longer than claws 222, 224 and 226. When the two annuli are assembled, the claws are interlaced (FIG. 2B). Coils 232, 234 and 236 are respectively wound around the base of claws 212, 214 and 216 of the magnetic circuit. The axis of the cylindrical plane defined by the coils is co-linear with the axis of the air gap between the rotor and the stator (FIG. 2C). The coils are evenly spaced apart.

Figure 3A:
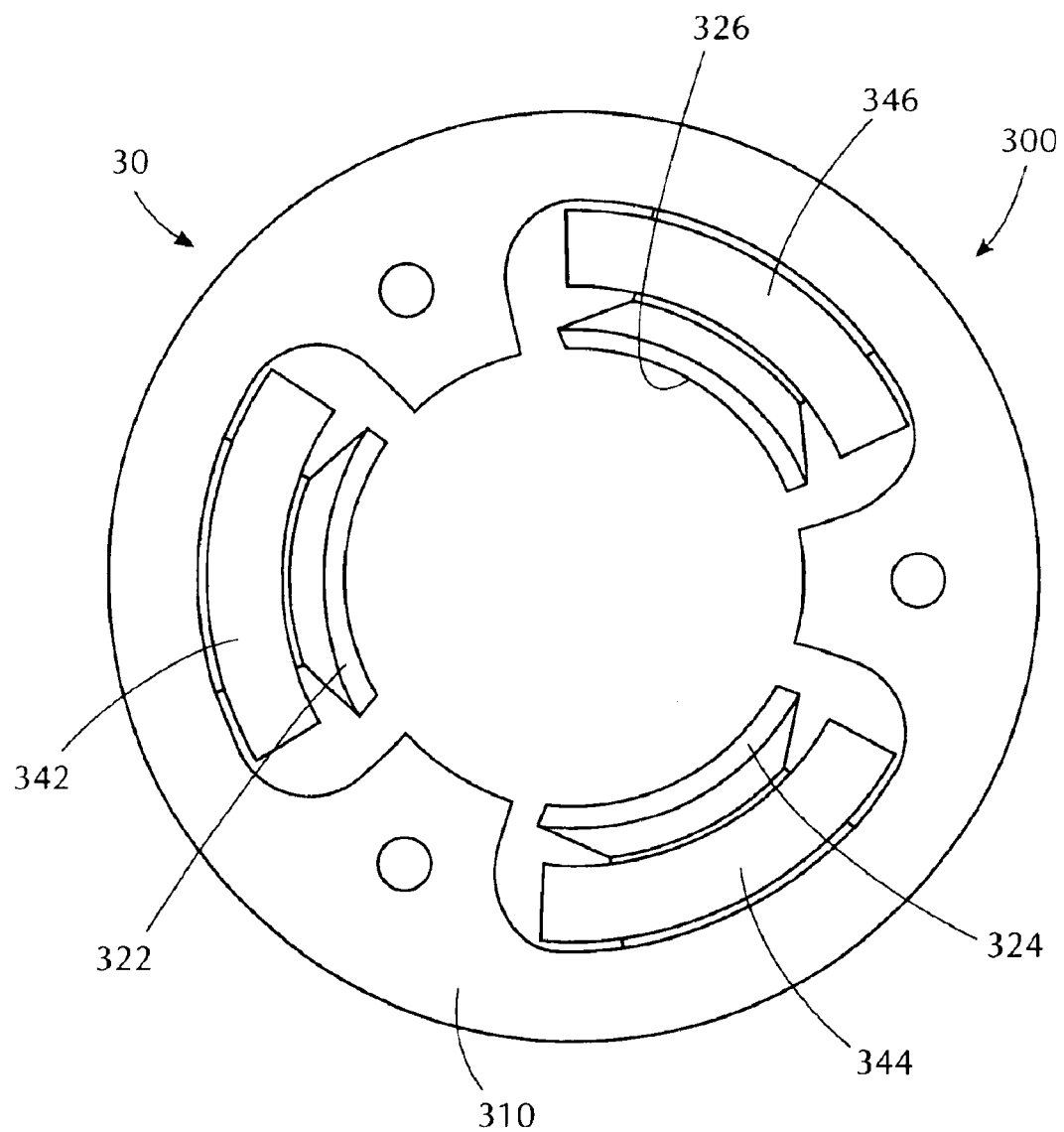
FIGS. 3A, 3B and 3C respectively depict front, assembled and exploded views of an alternative assembly of the structure in FIG. 2, wherein the magnetic circuit component is divided into three sections along the rotor axis, with three coils being mounted on the claws of the central magnetic circuit section, and with the two lateral sections of the magnetic circuit component being identical.
Figure 3B:
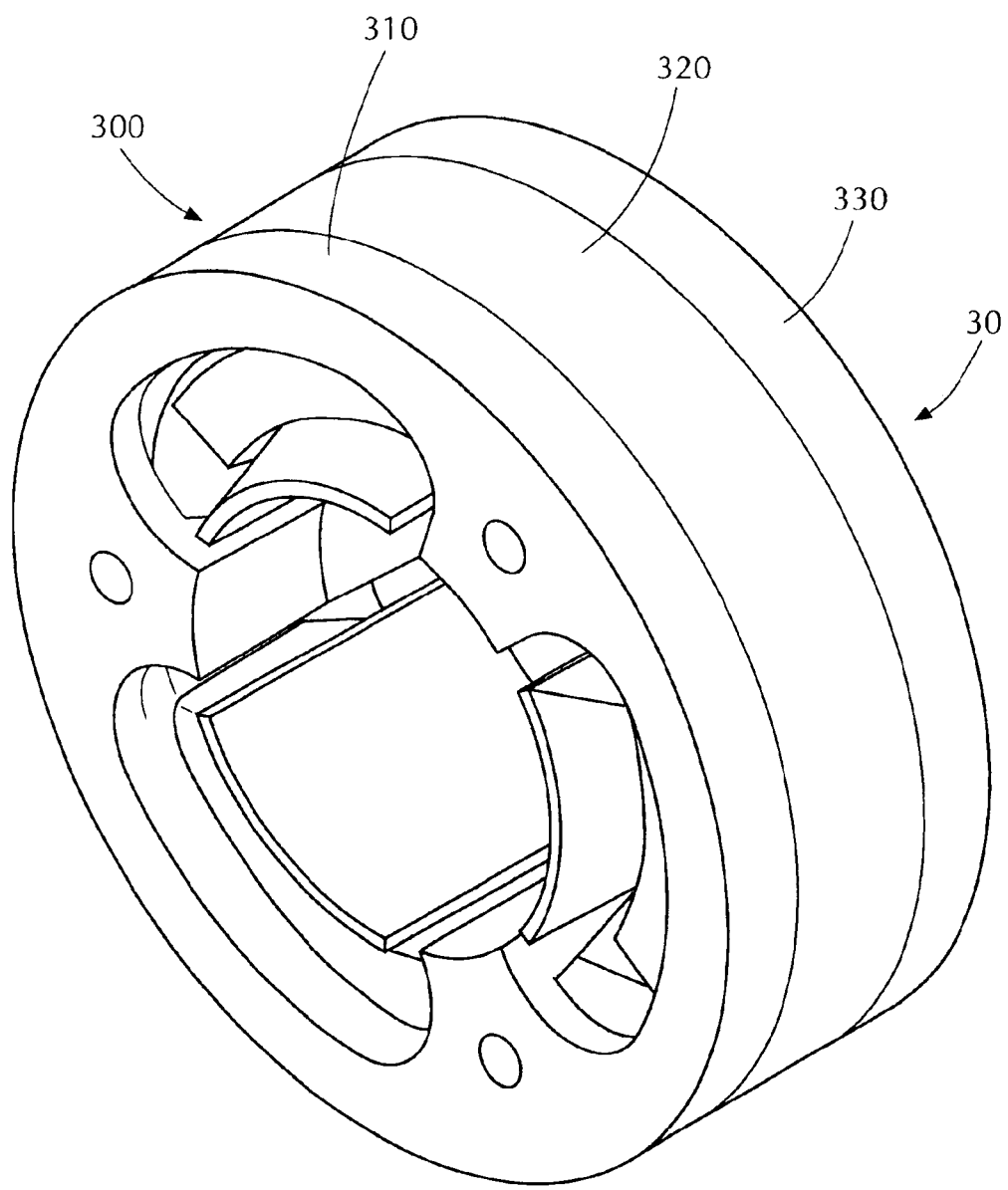
Figure 3C:
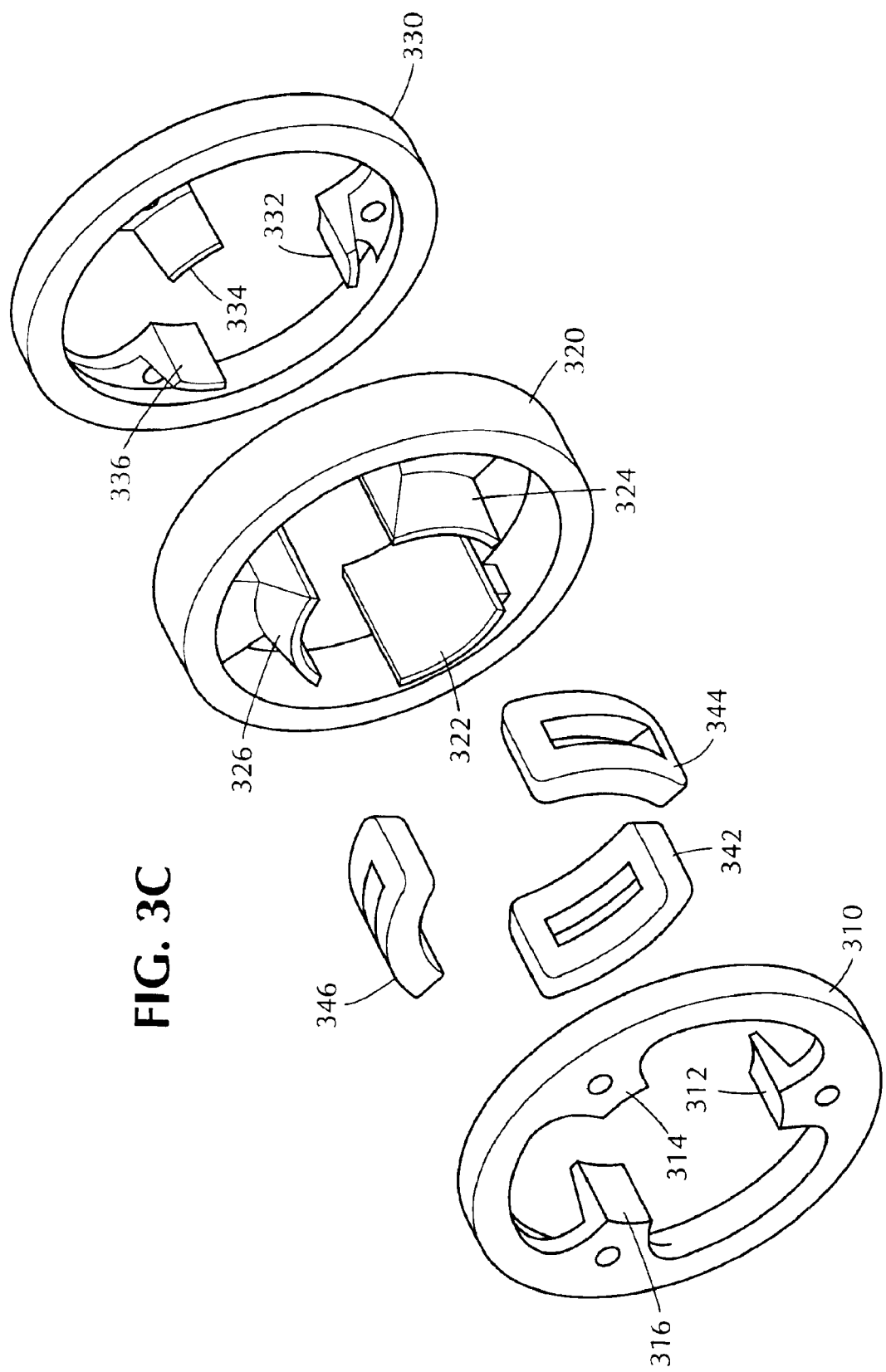

FIGS. 3A, 3B and 3C illustrate an alternative embodiment, magnetic circuit component 30, employing three stator rings having three rows of claws. This arrangement encloses the windings completely and minimizes the axial length of the machine. It also ensures that no parts of the windings exceed the total length of the magnetic circuit in a direction perpendicular to the rows of claws. In the embodiment of FIG. 3, the yoke 300 is formed from three annuli, 310, 320 and 330 (FIGS. 3B and 3C). The two outer annuli 310, 330 are identical, and each supports three claw poles (FIG. 3C). The central annulus 320 supports the windings 342, 344 and 346 on claws 322, 324 and 326. In this particular embodiment, the top surfaces of claws 322, 324 and 326 of the central annulus 320 are enlarged in the axial and circumferential directions.

To manufacture circuit component 30, the coils are first wound directly on the base of their respective claws. The assembly of the magnetic circuit component then follows with the two outside annuli 310, 330 (FIG. 3B). As can be seen, the top surfaces of the claws are shaped to result in the top surfaces of the claws being interlaced after assembly.

In the embodiments of FIGS. 2–12, a row of claws which support a winding is adjacent either one row of claws without windings (FIG. 2), or is sandwiched between two rows of claws without windings (FIGS. 3–12). Comparing FIG. 7 with FIG. 9, it will be seen that in FIG. 9 claws 912, 914, 916, 932, 934, 936 of the outside annuli 910, 930 have been radially slotted (divided in two, in the radial direction, to define an air gap between them). This serves to connect the air gap through to the yoke. Taking the preceding description into account, the structures in FIGS. 7 and 9 always possess the same number of claws. In general, the characteristics of these structures are that the number of coils Nb, the number of claws G1 and G2 and the number of pairs of magnetic poles of the inductor (the opposite part with respect to the air gap), satisfy the following relationships:

| | |
|---|---|
| Nb = k1.Mph | k1 is an integer equal or greater than 1. |
| G1 = k2.Nb | k2 is an integer equal or greater than 1. |
| G2 = G1 + k3.Nb | k3 is equal to −1 or 0 and G2 > 0. | where:

Mph is the number of phases; Mph being higher than 1;

P is the number of pairs of magnetic poles produced by the inductor (the opposite motor part);

Nb is the total number of coils distributed regularly along the length of a row of claws;

G1 is the total number of claws in a row supporting any winding; and

G2 is the total number of claws in a row not supporting any winding.

In the embodiments of this invention, the coils associated with each phase are mounted in phase order around the circumference of the stator. The same sequence is repeated several times when a phase is generated using more than one coil. For example, in the case of a three-phase machine, with identified phases A, B and C, the order of the coils is A, B, C if the machine has three coils. The order of the coils becomes A, B, C, A, B, C if the machine has six coils and A, B, C, A, B, C, A, B, C in the case of nine coils. The coils of each phase can be connected either in series or in parallel, in accordance with the application and design.

Table I provides the characteristics of several three-phase structures with three coils, which are in accord with the preceding relationships. In Table I, the excitation sequence of the three coils is assumed to be A B C. The embodiments in FIGS. 2 to 4 and FIGS. 7 to 11 are designed in accordance with this table.

Figure 7A:
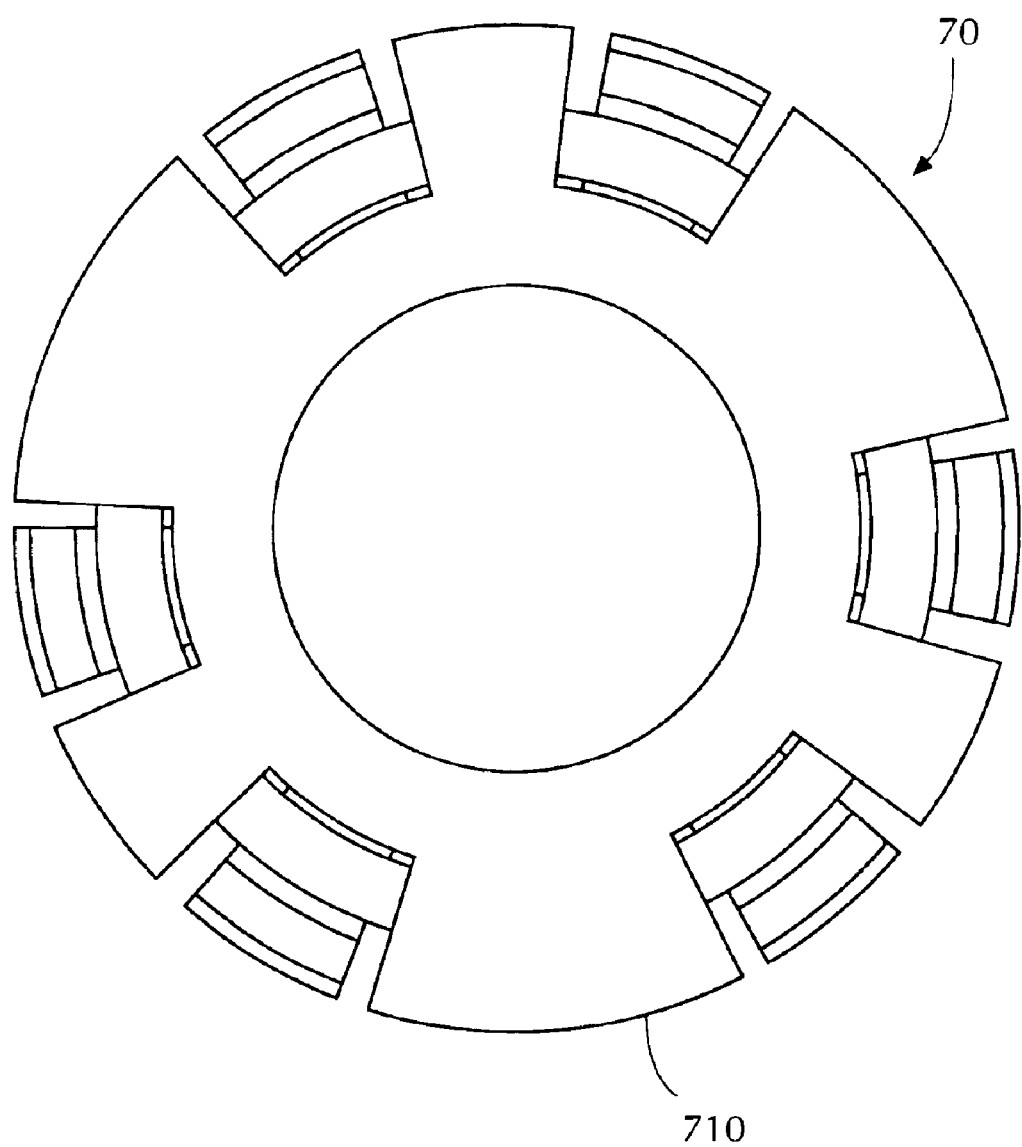
FIGS. 7A, 7B and 7C respectively depict front, assembled and exploded views of another three-phase magnetic circuit component of the present invention, which is for use with a rotor or external stator producing 14 or 16 magnetic poles in the air gap, and wherein the magnetic circuit component is divided into three parts, three coils are mounted on the central part, surrounded by a number of claws, and the distribution of the claws on the central part of the magnetic circuit components and on the lateral parts is irregular.
Figure 7B:
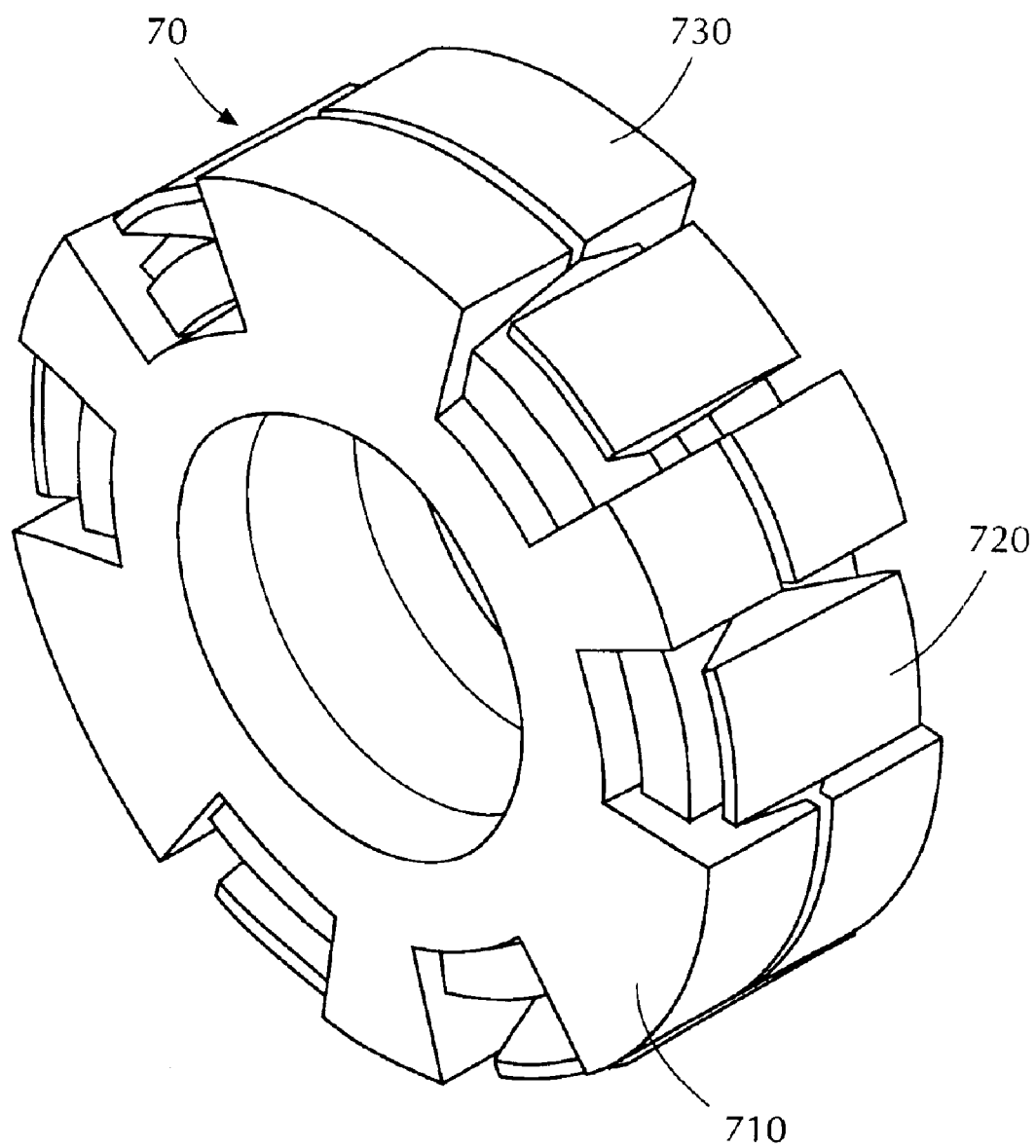
Figure 7C:
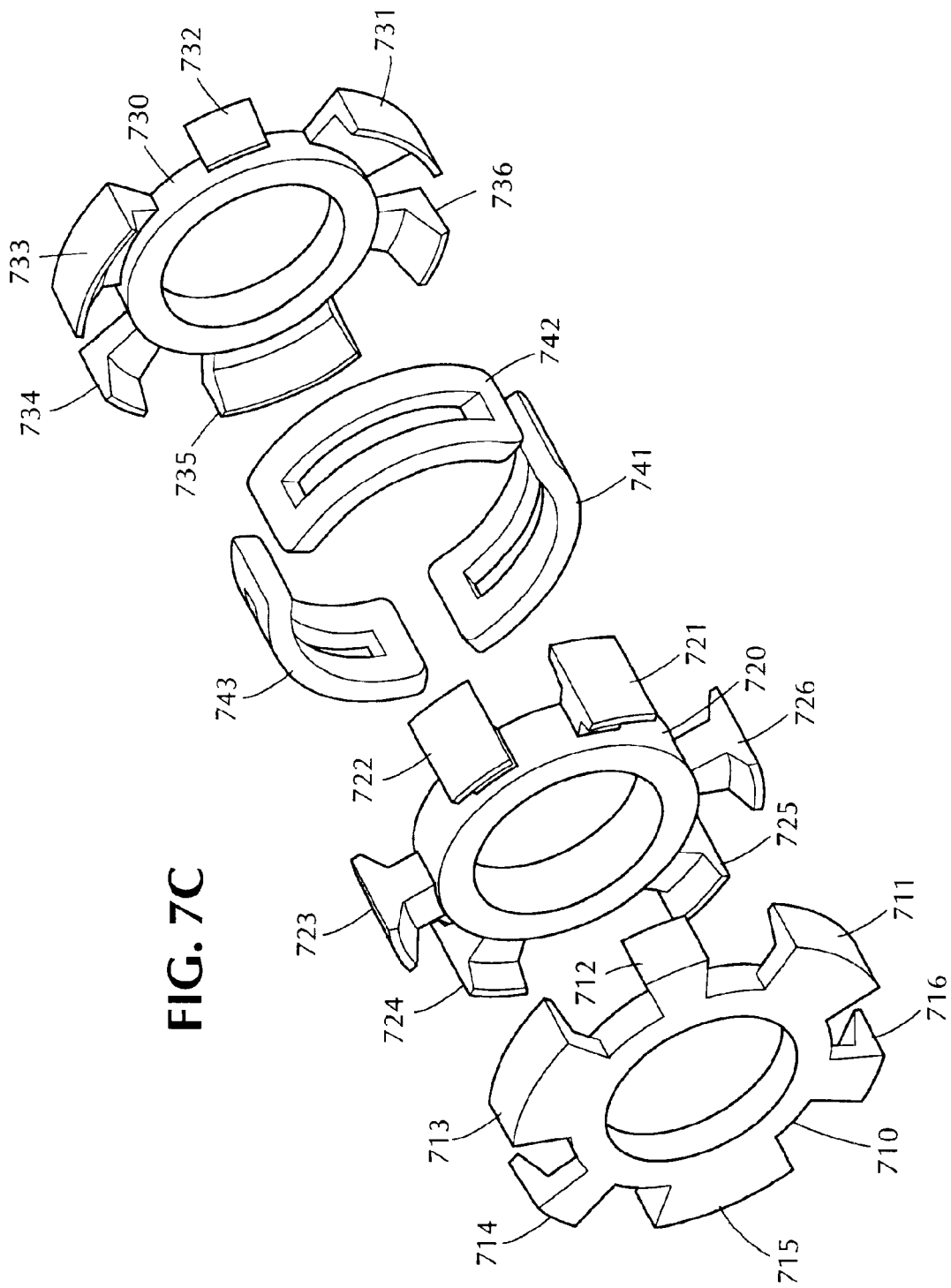

FIG. 7 illustrates a magnetic circuit component 70 which is for use with another structure (rotor or stator) that possesses fourteen to sixteen magnetic poles in the air gap in order to achieve the best performance. In the FIG. 7 embodiment, the air gap between the stator and the rotor is on the external surface of component 70. The magnetic circuit component 70 incorporates three rows of claws (FIGS. 7B and 7C). Each row is positioned on a separate annulus. The two lateral annuli 710, 730 are identical, each having six claws (711–716 for annulus 710; 731–736 for annulus 730), not all possessing the same angular width (see FIG. 7C). The central annulus 720 has six claw poles 721–726 (FIG. 7C). The distribution of claws on each annulus and around each row is not uniform (see FIGS. 7A and 7C). Three coils 741, 742 and 743 are mounted on the central annulus 720 (FIG. 7C). Each coil is wound around the bases of two claws (e.g., coil 742 is wound around claws 721, 722). Thus, the coils are not interlaced.

Figure 8A:
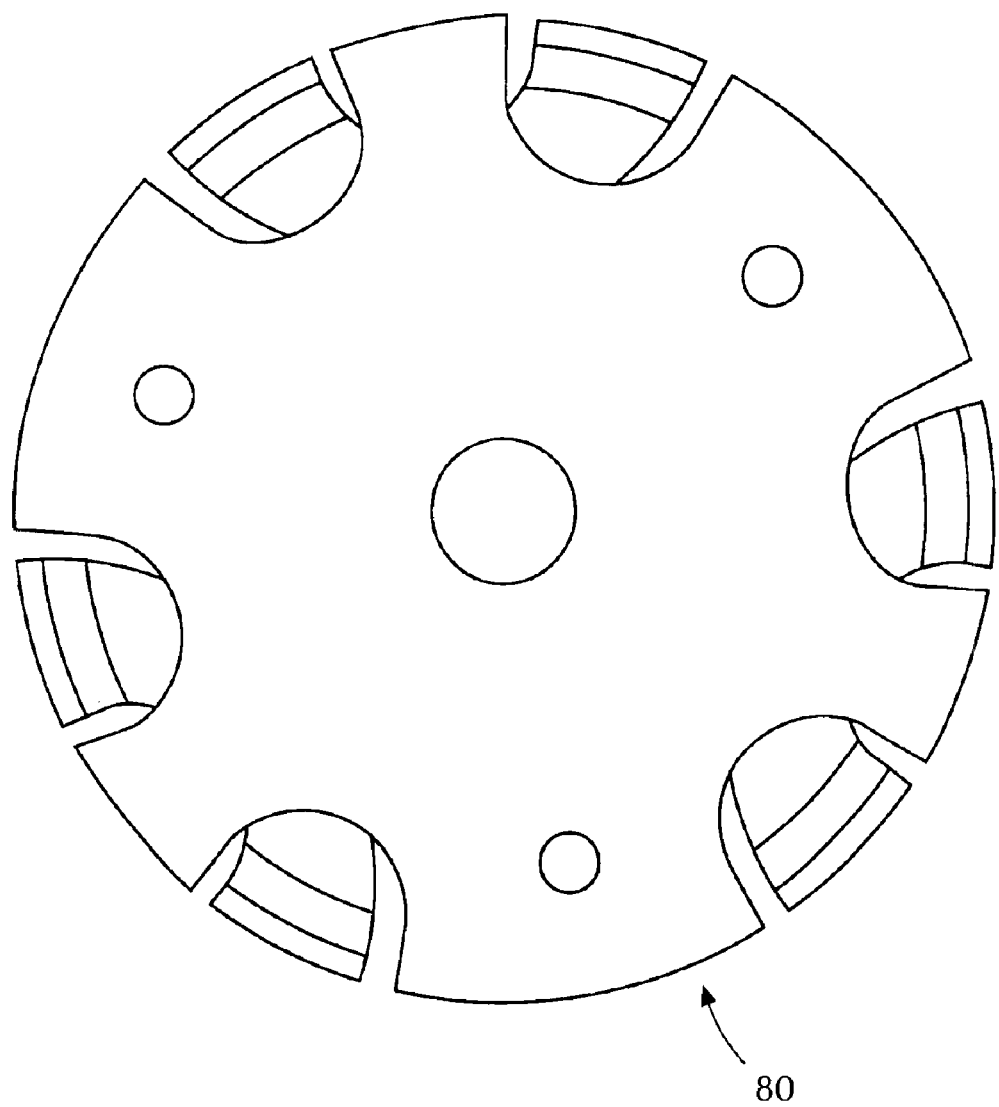
FIGS. 8A, 8B and 8C respectively depict front, assembled and exploded views of an alternative design of the structure in FIG. 7, wherein the central piece has been modified to minimize the amount of copper required in the coils, a number of claws on the lateral parts have been regrouped, and there are two different claw widths on the lateral parts.
Figure 8B:
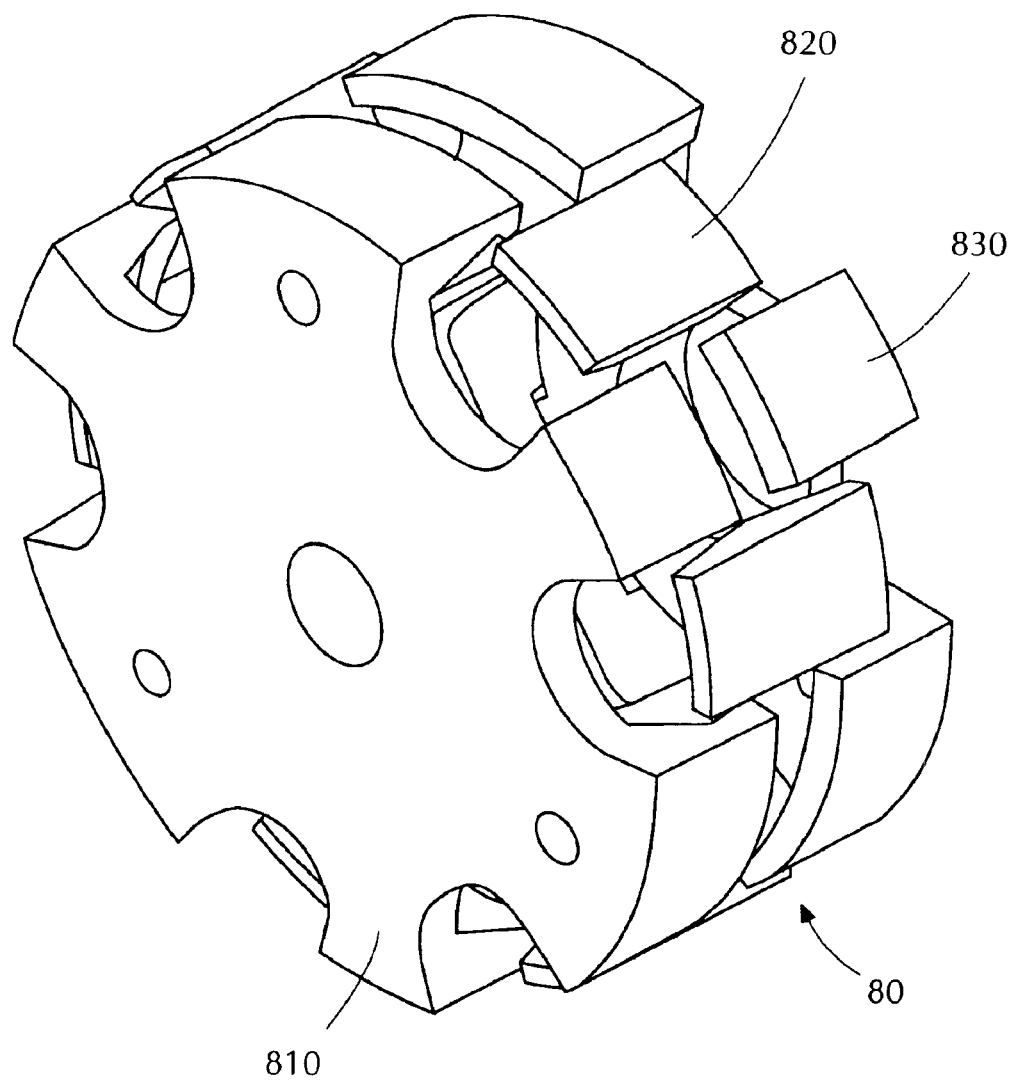
Figure 8C:
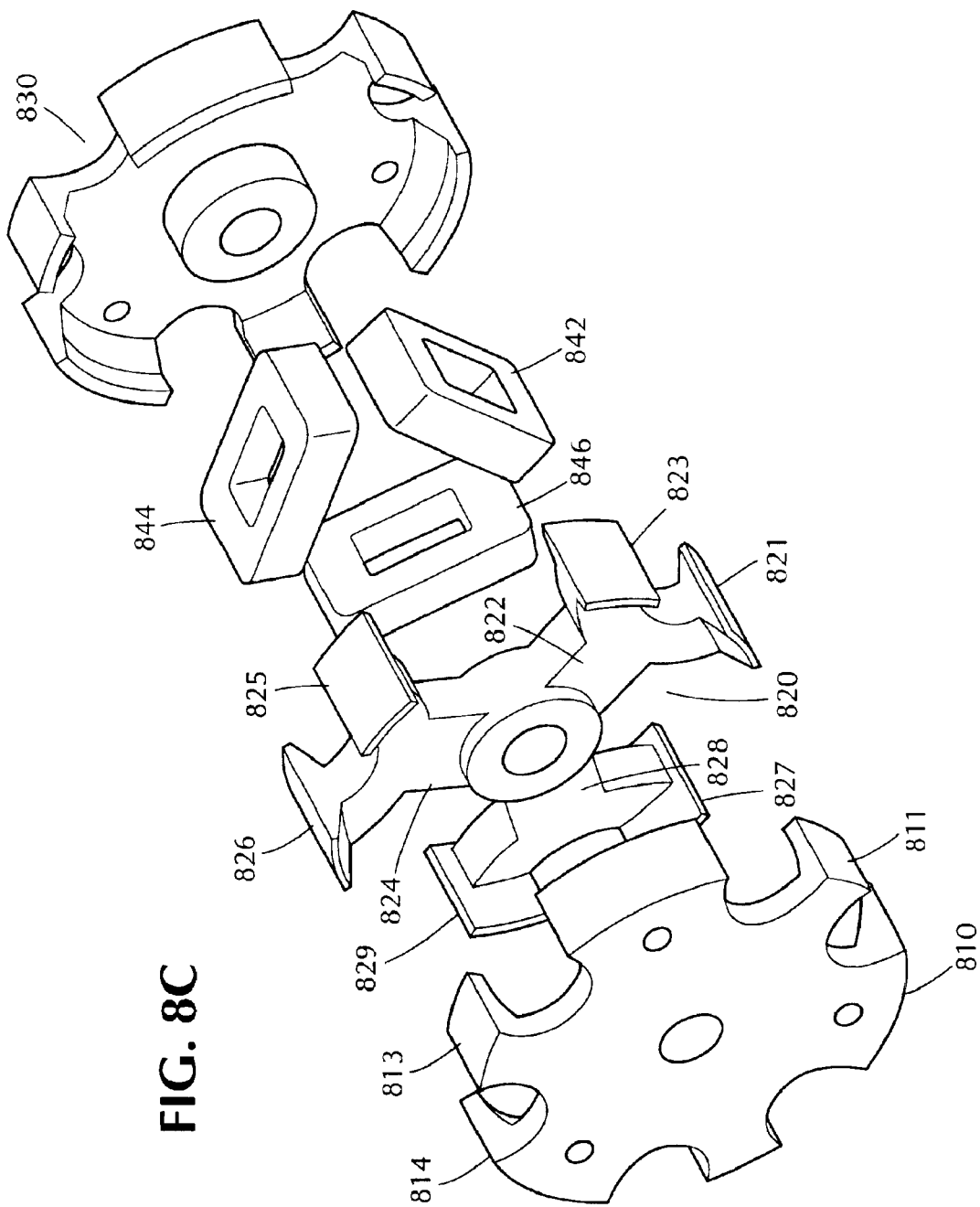

To minimize the length of turns of the coil and the wire volume, it is preferable to modify the central annulus by having two claw poles joined at a common base, on which the coil is wound. This is shown in the embodiment of FIG. 8, and particularly FIG. 8C, wherein claw poles 821 and 823 are joined at base 822. Likewise, claw poles 825 and 826 are joined at base 824 and claw poles 827 and 829 are joined at base 828. Since the position of the claws about the air gap should be invariant, a space is left for the claws positioned on the lateral annuli 810, 830. As can be seen, each claw pole and its base forms a Y-shape (FIG. 8C). The windings 842, 844 and 846 are mounted on the lower portion of bases 822, 824 and 828, respectively. It can be seen from FIG. 8C that the dimensions of the coils are smaller than the case in FIG. 7C. The shape of the lateral annuli have also been modified, as can be seen by comparing 810, 830 in FIG. 8C with 710, 730 in FIG. 7C. These modifications to the design of the different parts of the magnetic circuit have no effect on performance, except possibly as regards the cogging torque. The structure in FIG. 8 provides the advantage of an important reduction in the amount of copper required compared with the structure in FIG. 7. In FIG. 8, the air gap is located on the outside of the magnetic circuit component 80. However, the same technique of having claw poles joined at a common base can also be employed in components having an internal air gap, such as component 20 in FIG. 2.

Figure 9A:
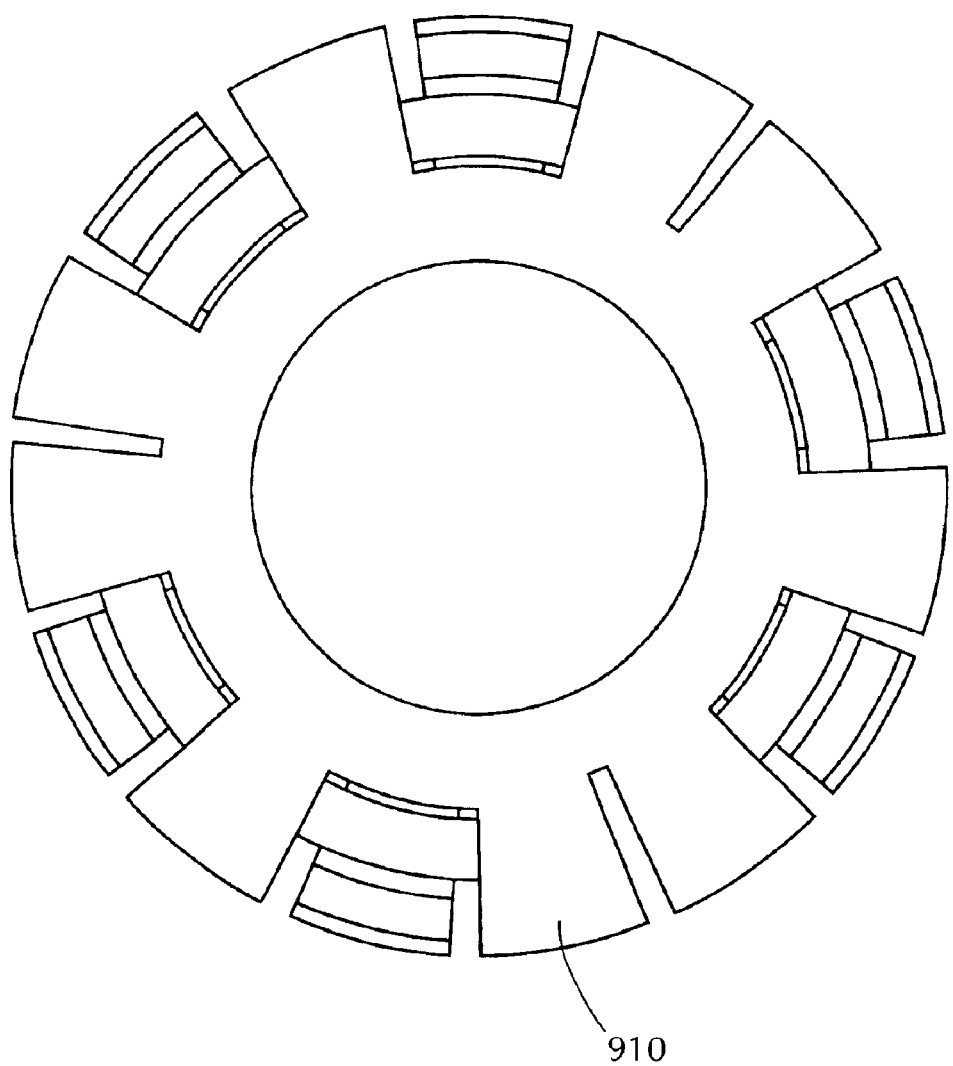
FIGS. 9A, 9B and 9C respectively depict front, assembled and exploded views of an alternative design of the structure in FIG. 7, wherein a number of the claws on the lateral units have been slotted to minimize oscillations of the cogging torque.
Figure 9B:
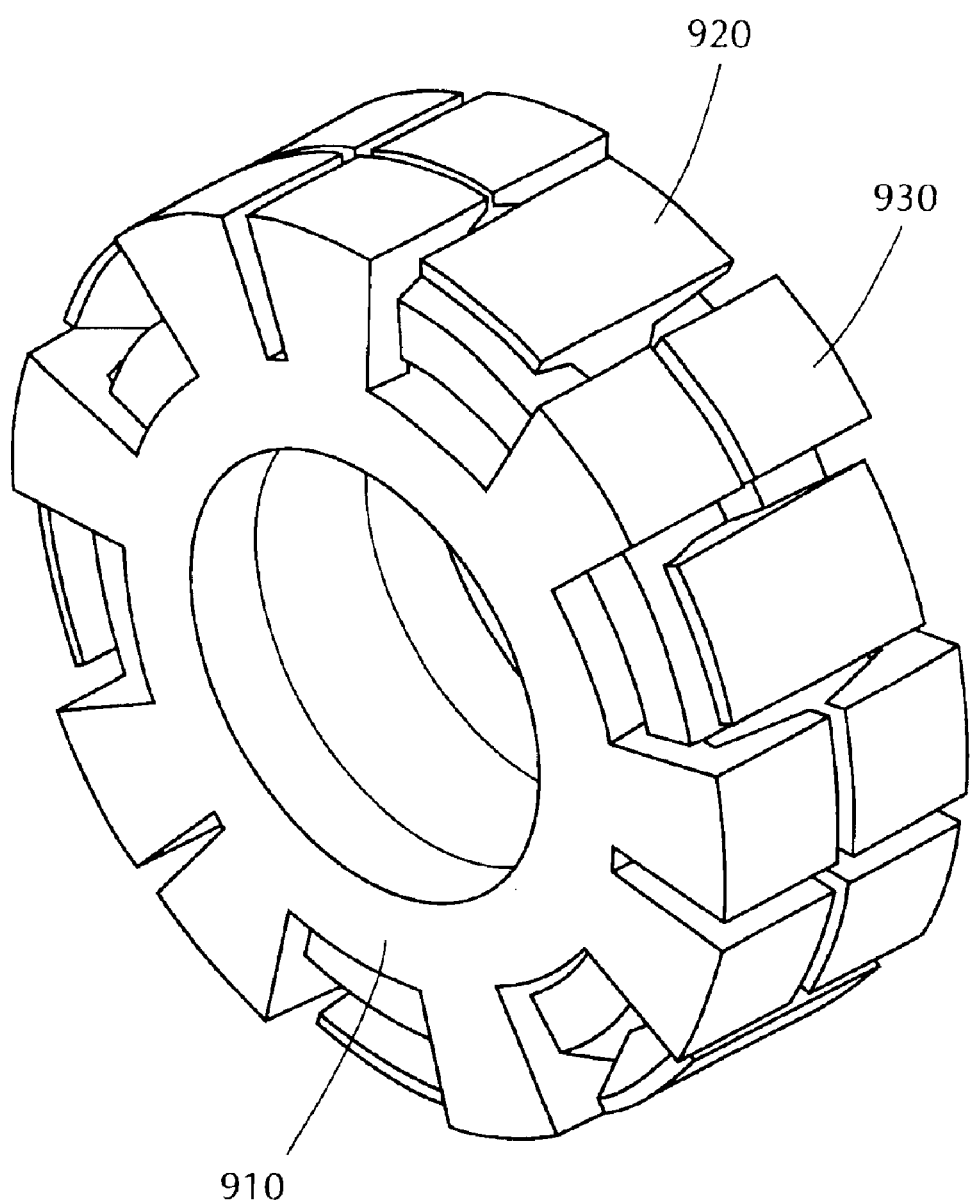
Figure 9C:
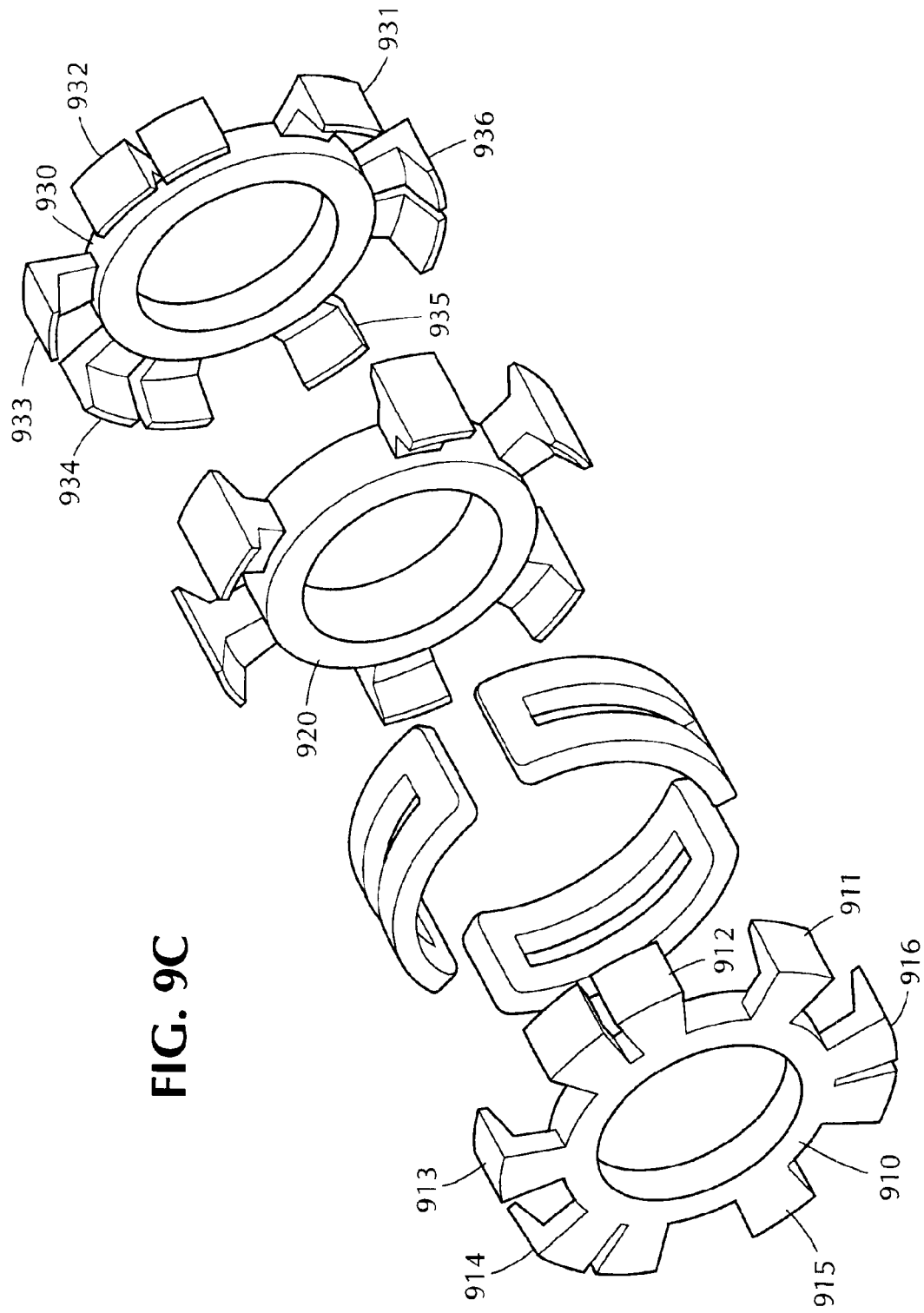

As explained above, in the embodiment of FIG. 9, the claws 912, 914 and 916, and 932, 934 and 936, have been radially slotted. This arrangement does not change the number of claws, but allows an increase in the frequency of the cogging torque, thus helping to reduce its amplitude. FIG. 9A shows that when the magnetic circuit component is assembled, there are fifteen claw poles covering the air gap. It is possible to carry out other types of modifications to the magnetic circuit component affecting the cogging torque, such as slots or grooves on the claws with lower depths, or special profiling of the claws.

Figure 10A:
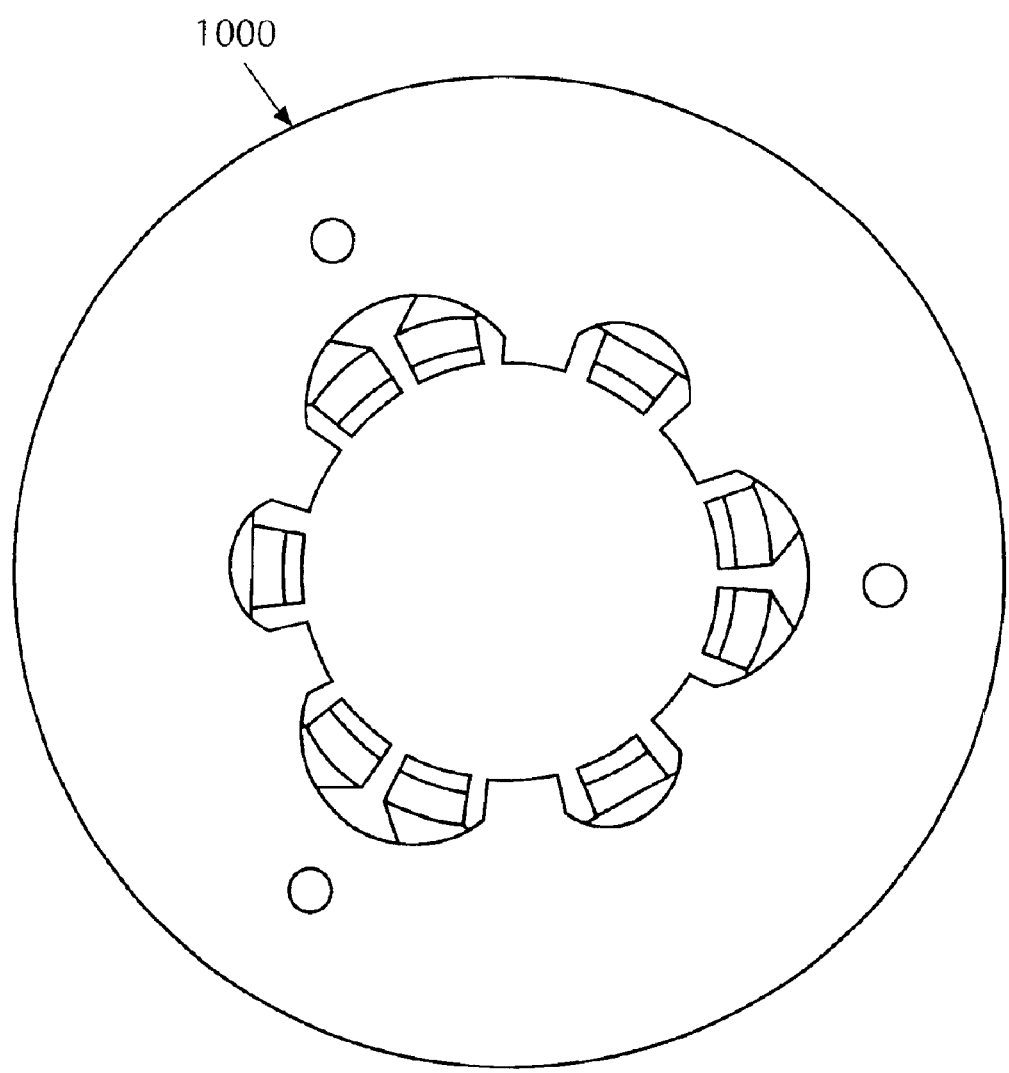
FIGS. 10A, 10B and 10C respectively depict front, assembled and exploded views of a three-phase structure for use with a rotor, or external stator, producing 14 or 16 magnetic poles in the air gap, wherein the central part of the magnetic circuit component possesses nine claws which are distributed irregularly, the bases of the claws are arranged in groups of three to reduce the space taken up by the three coils mounted on the central part, and the lateral parts of the magnetic circuit are identical, each consisting of six irregularly distributed claws.
Figure 10B:
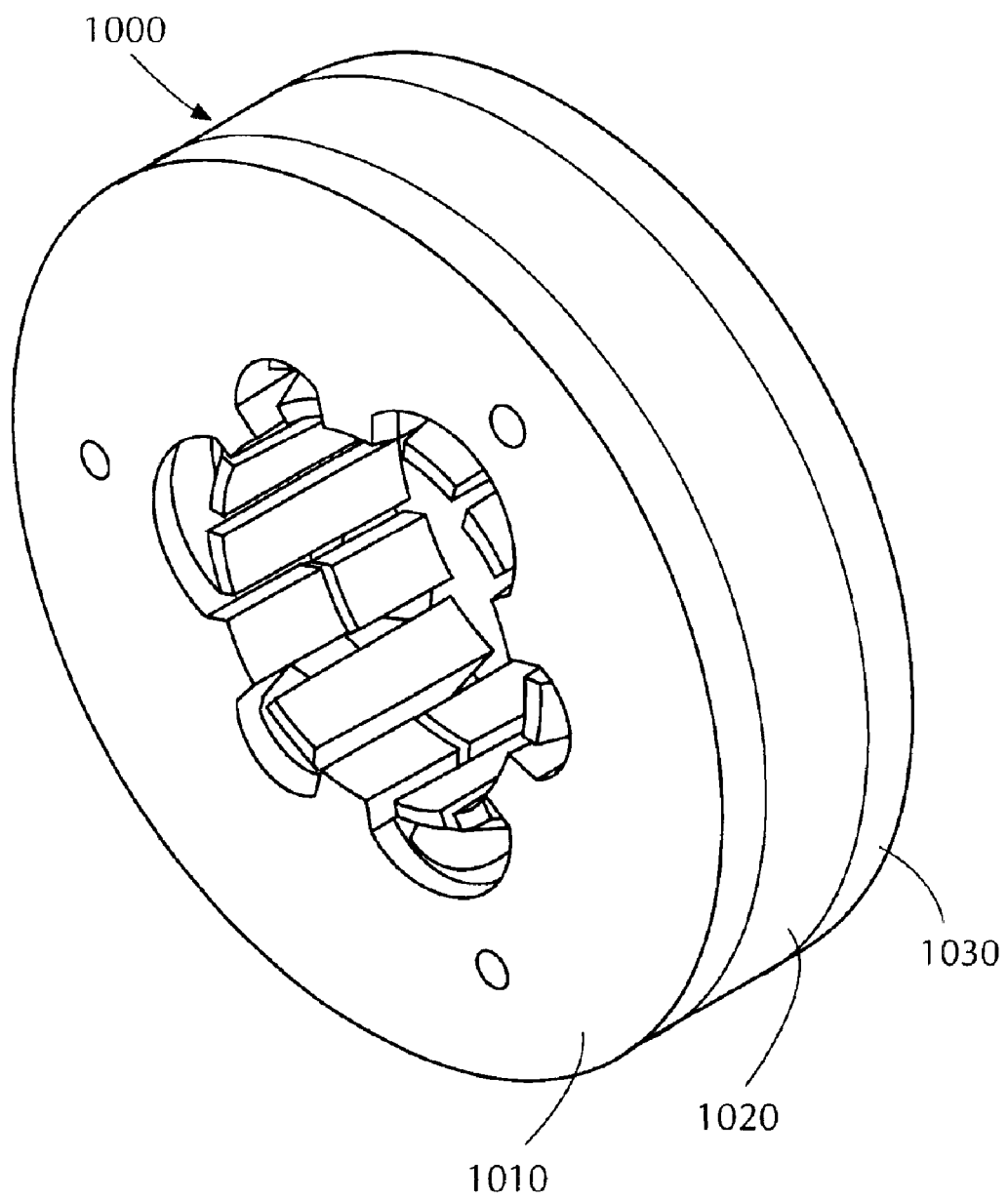
Figure 10C:
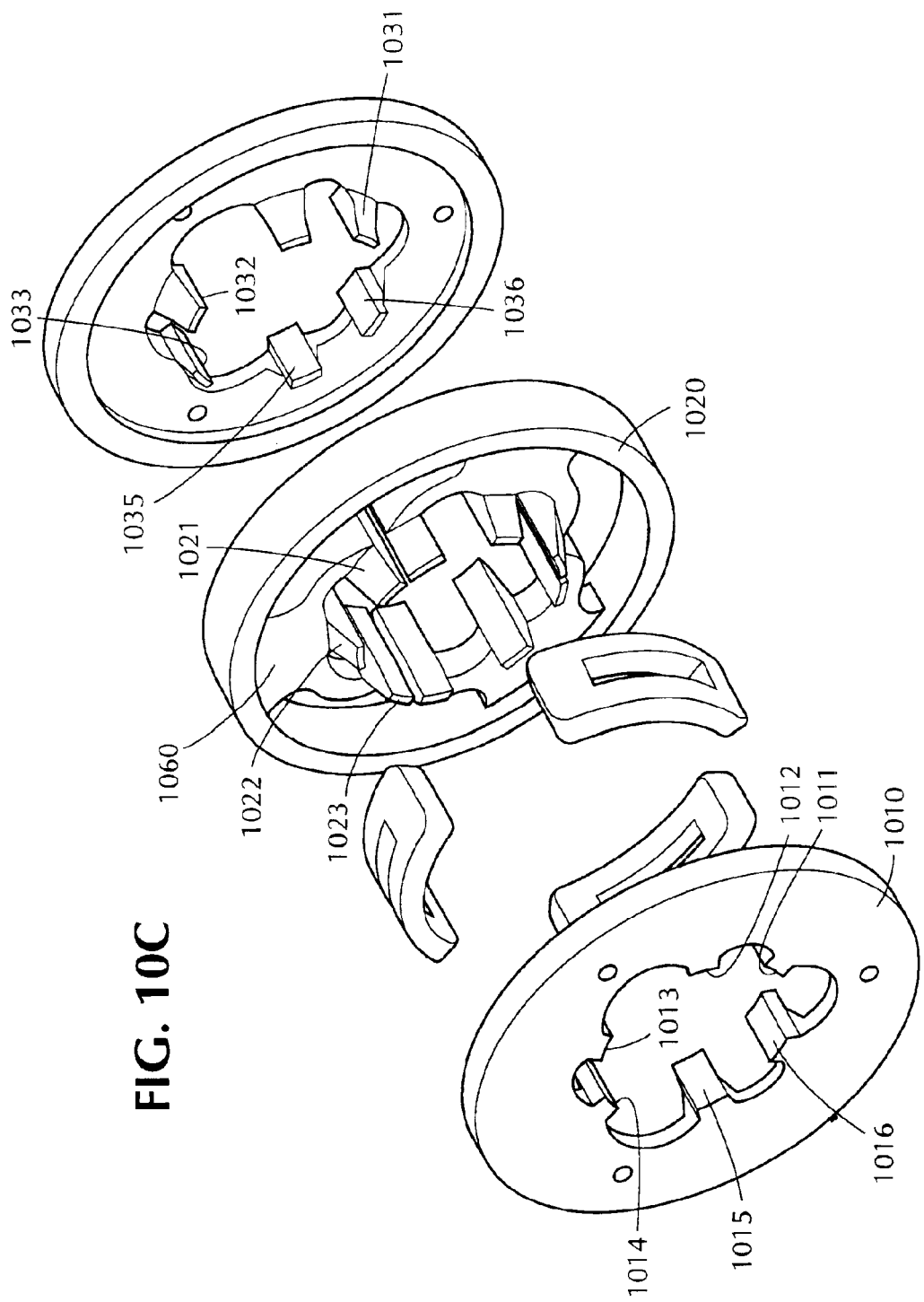
Figure 11A:
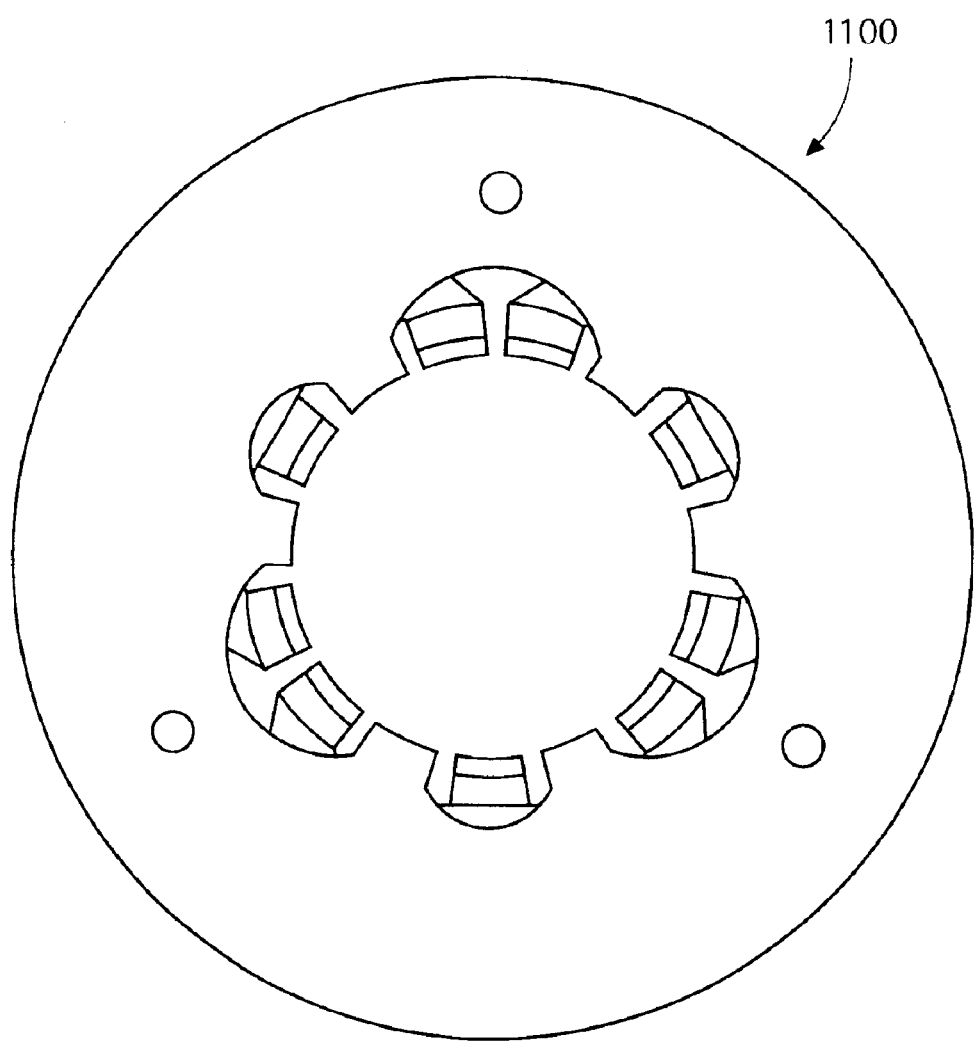
FIGS. 11A, 11B and 11C respectively depict front, assembled and exploded views of another assembly of the structure in FIG. 10, wherein the central part has been divided into three identical parts to simplify the mounting of the coils, and the three parts are mechanically held together by the two lateral pieces of the magnetic circuit component.
Figure 11B:
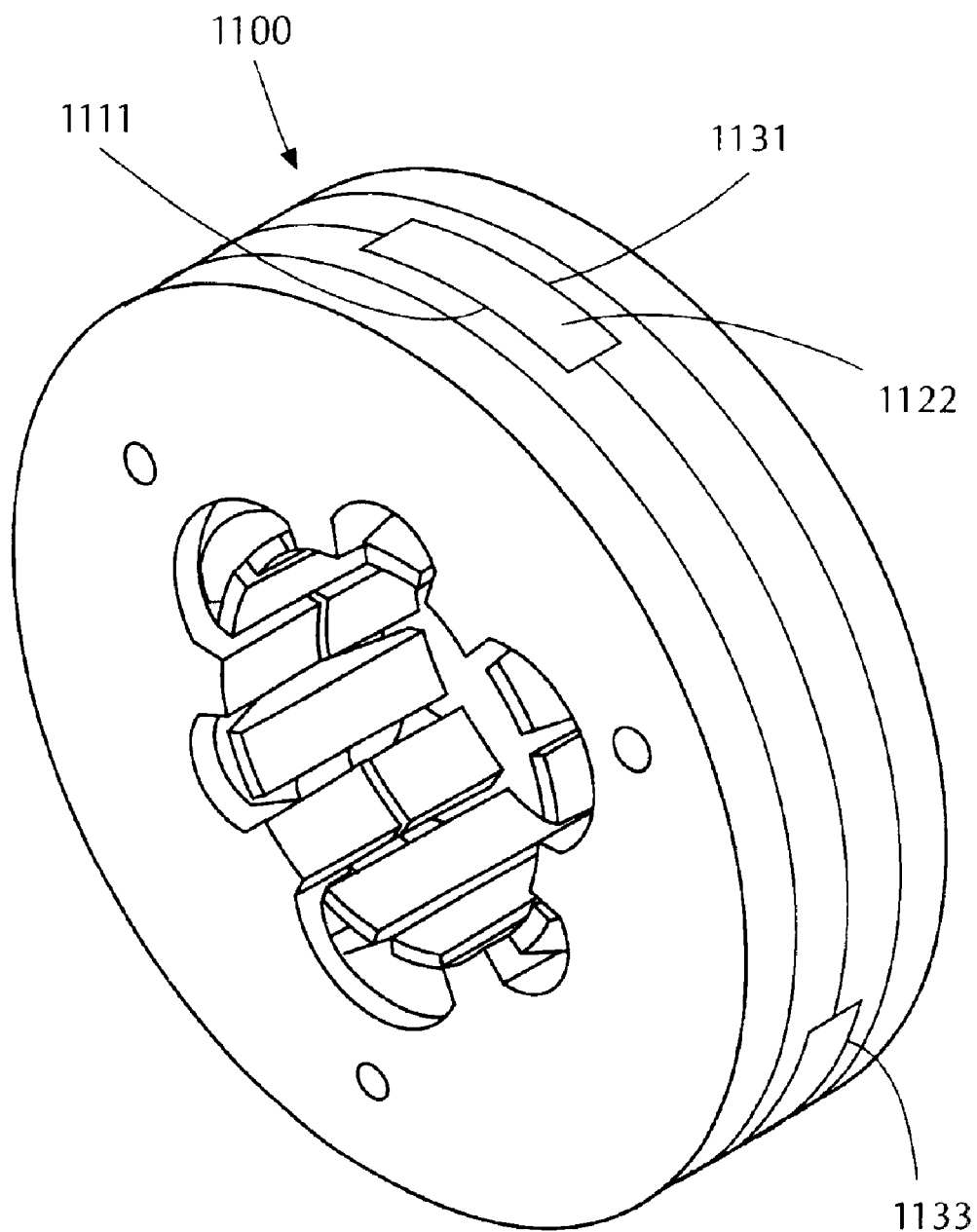
Figure 11C:
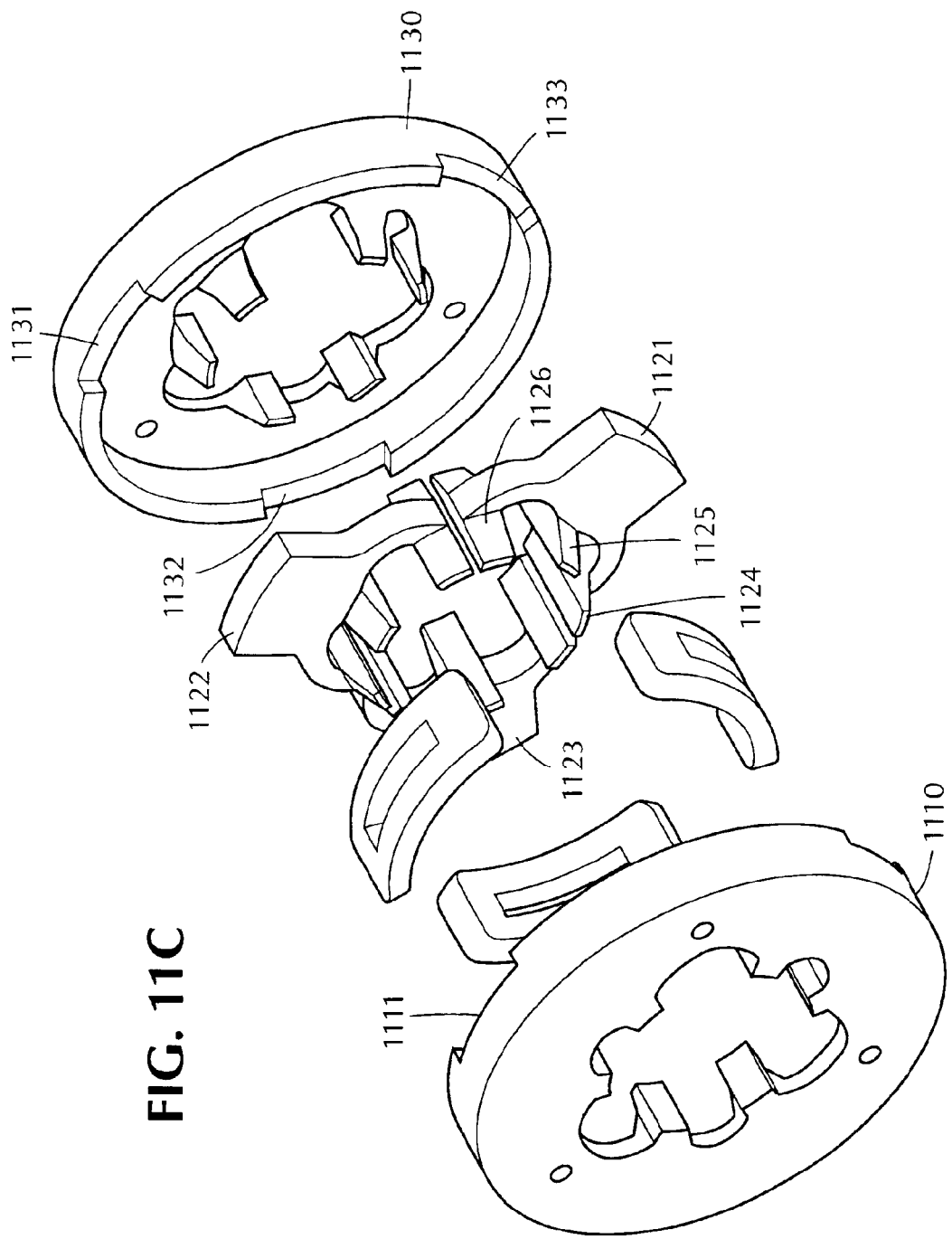

FIGS. 10 and 11 illustrate three-phase magnetic circuit components 1000 and 1100 respectively, each of which is an outer armature used with another component (an inductor, either a rotor or stator; not shown) that produces fourteen or sixteen magnetic poles in the air gap to achieve the best performance. In each of these embodiments, the air gap is located on the internal surface of the component. As was the case with the embodiment of FIG. 9, each of the magnetic circuit components 1000 and 1100 contains three rows of claws (FIGS. 10B and 11B). Component 1000 is made up of three annuli, 1010, 1020, 1030, each of which has one row of claw poles. The two outside annuli 1010, 1030 are identical, and each has six claws (1011–1016 for 1010; 1031–1036 for 1030). (FIG. 10C). The central annulus 1020 has nine claw poles (FIG. 10C). The spacing of the claws on each annulus and around each row is irregular (FIGS. 10A and 10C), but all the claws have the same circumferential dimensions (FIG. 10A). As in the case of the component in FIG. 8, the claw poles carried by annulus 1020 have been grouped into threes, with each group of three sharing a common base. (FIG. 10C). Thus, for example, claw poles 1021, 1022 and 1023 share a common base 1060. This advantageously reduces the length of the coil turns and hence the amount of conductive wire required.

The embodiment shown in FIG. 11 facilitates the mounting of the coils. Rather than using a central annulus, such as annulus 1020 in FIG. 10, the embodiment of FIG. 11 substitutes three fork-like structures 1121, 1122 and 1123. Each of these structures has three claw poles, such as claw poles 1124, 1125 and 1126 of structure 1121. The wire coils are wound directly on the bases of structures 1121–1123. Annuli 1110 and 1130 each has three detents (e.g., 1131, 1132 and 1133 of 1130, and 1111 of 1110) into which the fork-like structures 1121, 1122 and 1123 are inserted during assembly. Thus structures 1121, 1122 and 1123 are held in place by the two lateral annuli 1110, 1130 of the magnetic circuit component 1100 (FIG. 11B).

Figure 12A:
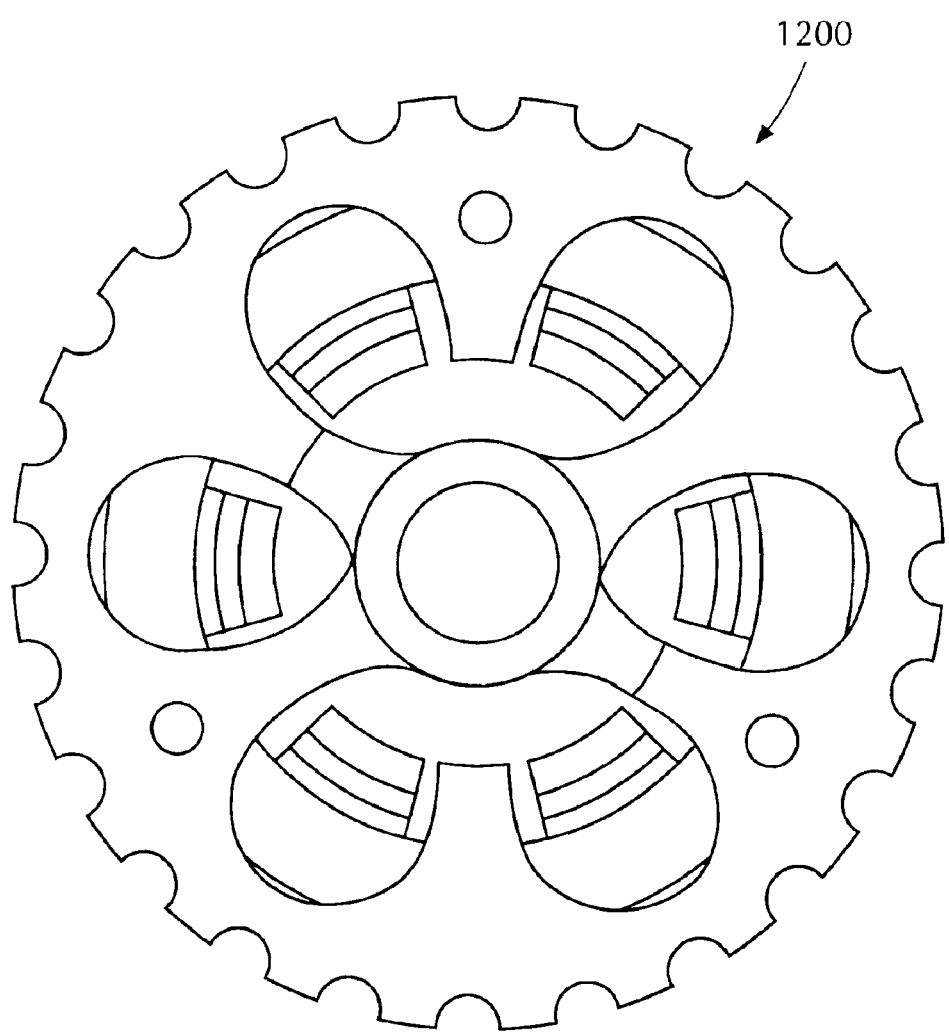
FIGS. 12A, 12B and 12C respectively depict front, assembled and exploded views of a three-phase structure incorporating six coils on the central part, wherein the external surface of the magnetic circuit component is equipped with cooling fins, and there are bearing supports on each lateral piece of the magnetic circuit component for the mechanical mounting of the rotor (not shown).
Figure 12B:
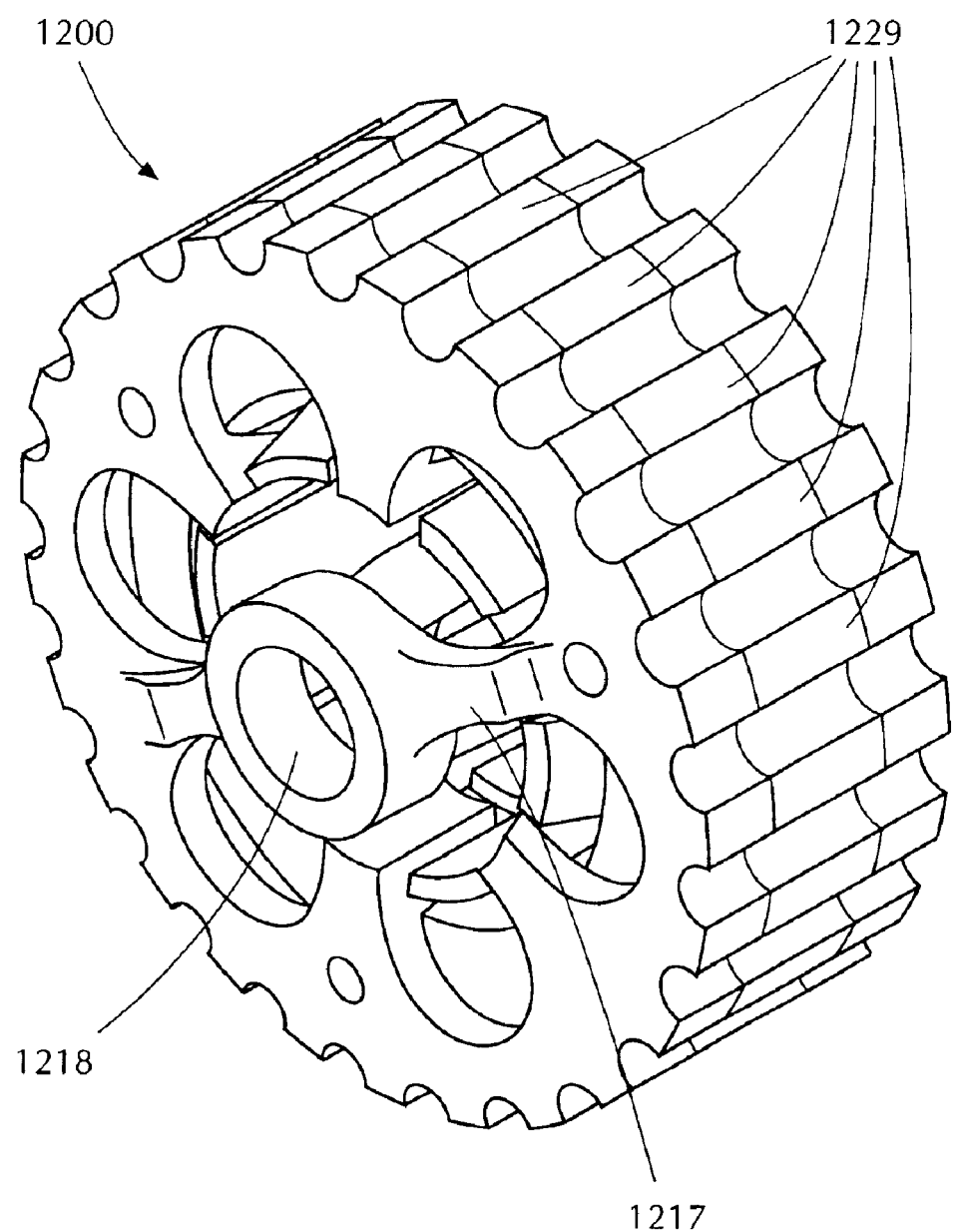
Figure 12C:
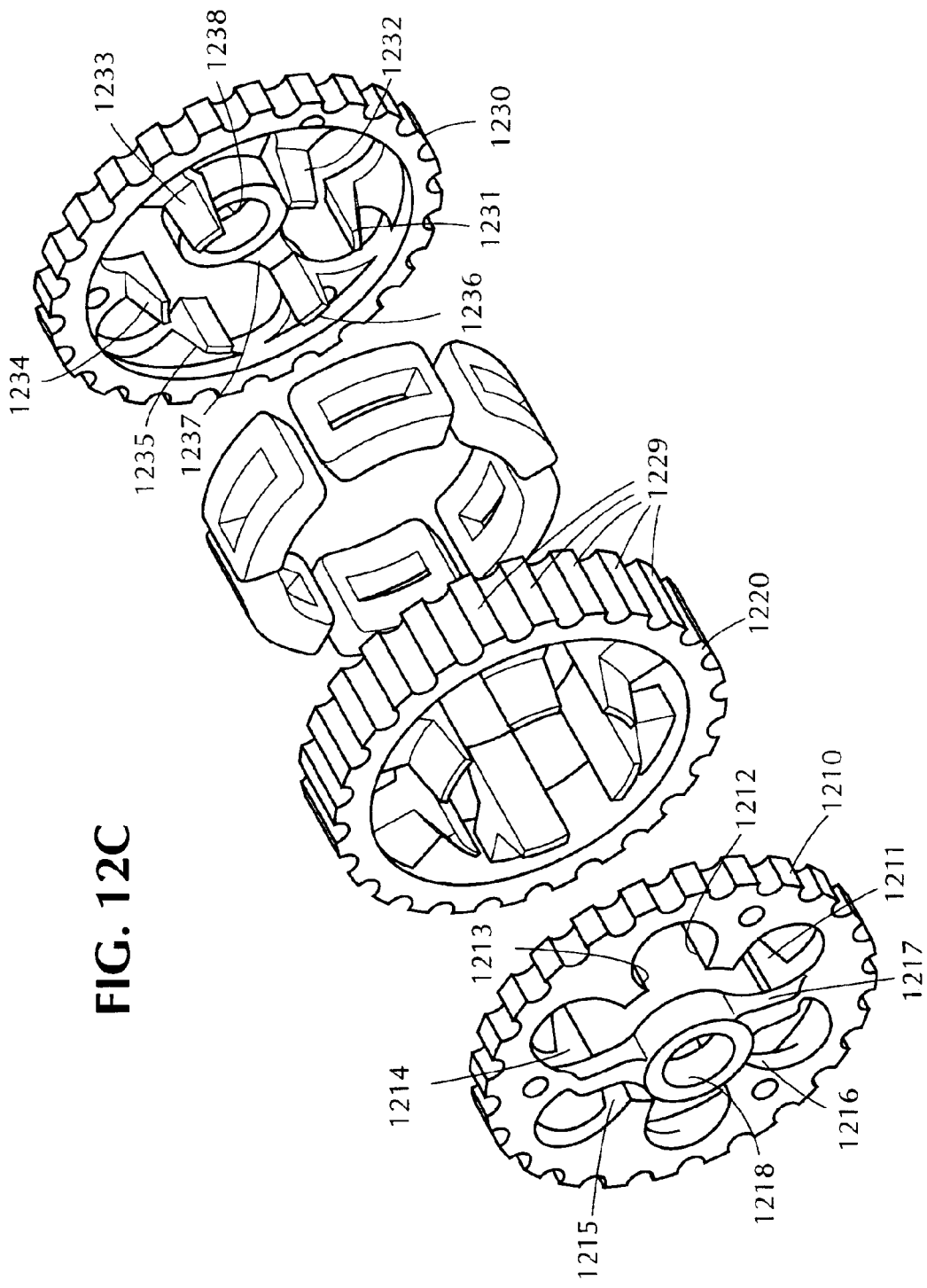

Table II shows several three-phase, six-coil structures with an A, B, C, A, B, C winding sequence. FIG. 12 illustrates an embodiment designed in accordance with this table. This particular structure, magnetic circuit component 1200, has an air gap inside its structure, and is for use with a rotor, or stator, producing eight magnetic poles in the air gap to ensure maximal performance. FIG. 12 generally illustrates the advantages the present invention can provide regarding the integration of magnetic, thermal and mechanical functions, with the result of minimizing the number of parts in the motor and simplifying the assembly. Due to the periodicity of the A, B, C, A, B, C winding sequence, the two diametrically opposed claws 1233 and 1236 of annulus 1240 are at the same magnetic potential. Thus, as is shown in FIG. 12C, two claws 1233 and 1236 can be (and are) joined by a cross-bar 1237 made of a magnetic material. Opposing annulus 1210 likewise has claws 1211, 1214 joined by a cross-bar 1217 made of magnetic material. In addition, cross-bars 1217 and 1237 contain circular bearing sleeves 1218 and 1238, which can support the corresponding rotor or stator (FIG. 12C). The cross-bars have no adverse affect on the magnetic flux trajectories. They can be mechanically fastened on the annuli 1210, 1230, or fabricated in conjunction with them from a composite magnetic material.

Because there are no end-windings in the present invention, additional parts made of magnetic or conductive materials, such as flanges, plates to support the bearings, etc., can be secured directly to the sections of the magnetic circuit which are not facing the rotor in the air gap. Contrary to classical structures, it is not necessary to use a large air gap (e.g., several millimeters), because there are no end-windings, and because the windings are magnetically shielded by the magnetic parts of the other structures in the present invention. The result is to beneficially reduce the total axial length of the machine.

It is also easy to equip these structures with a cooling system, using water circulation, either forced or natural convection of air or another suitable fluid. It is preferable to integrate the cooling system as part of the magnetic circuit. It is possible to compact the cooling system with the magnetic circuit as a single part, made with the same magnetic material. For example, FIG. 12 shows cooling fins 1229 arranged around the outer surface of annulus 1220 to increase the surface in contact with the ambient air. These fins form an integral part of the magnetic circuit component (FIG. 12A). In the present invention, the magnetic flux can circulate in these fins given appropriate orientation. With such an arrangement, the heat dissipation is improved, without increasing the weight, the total size and weight of the electrical machine is minimized, and the power and torque-to-weight ratio are increased.

Table III presents 4-coil, two-phase structures with a coil sequence A B A B.

Figure 5A:
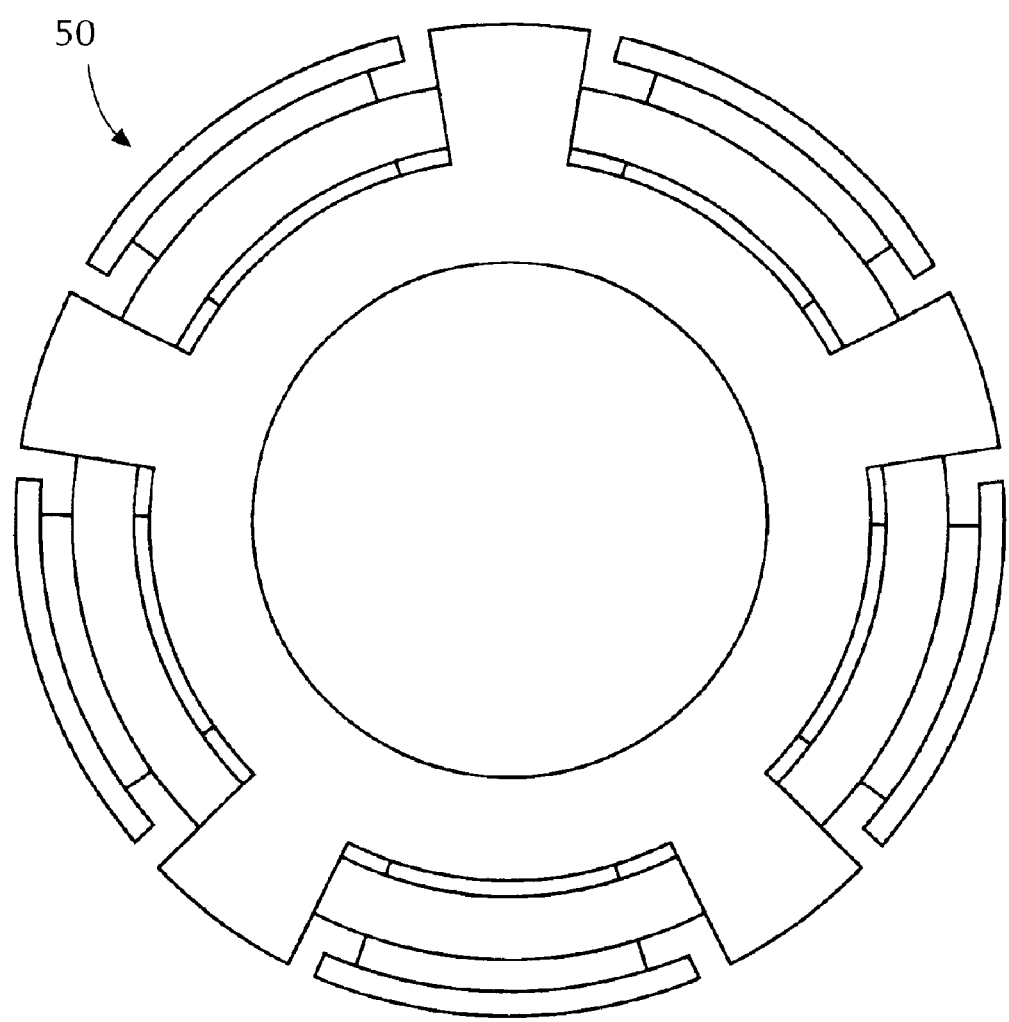
FIGS. 5A, 5B and 5C respectively depict front, assembled and exploded views of a five-phase structure based on the present invention, wherein the air gap is on the external surface, the magnetic circuit component is divided into three sections, with five coils mounted on the central part, and wherein the two lateral parts of the magnetic circuit component are identical.
Figure 5B:
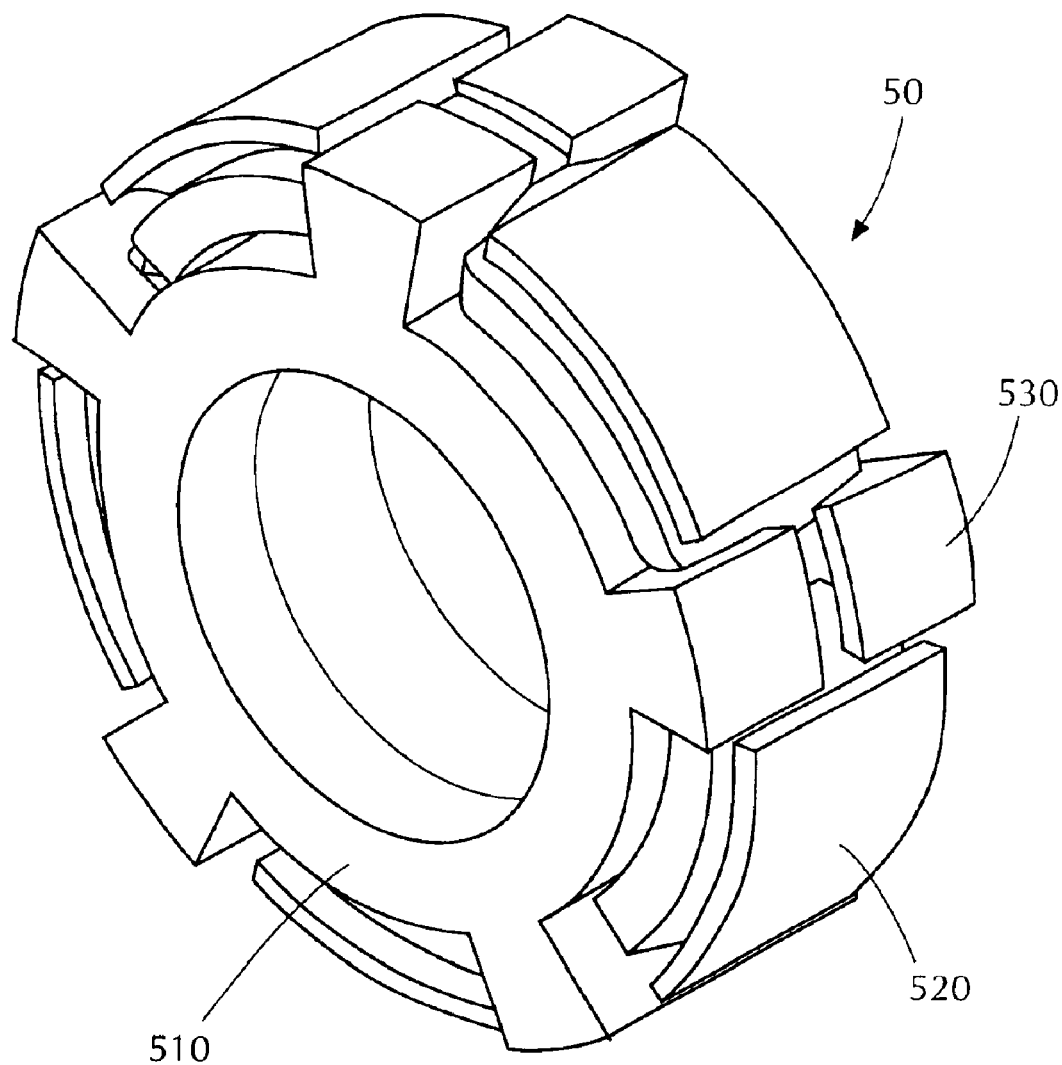
Figure 5C:
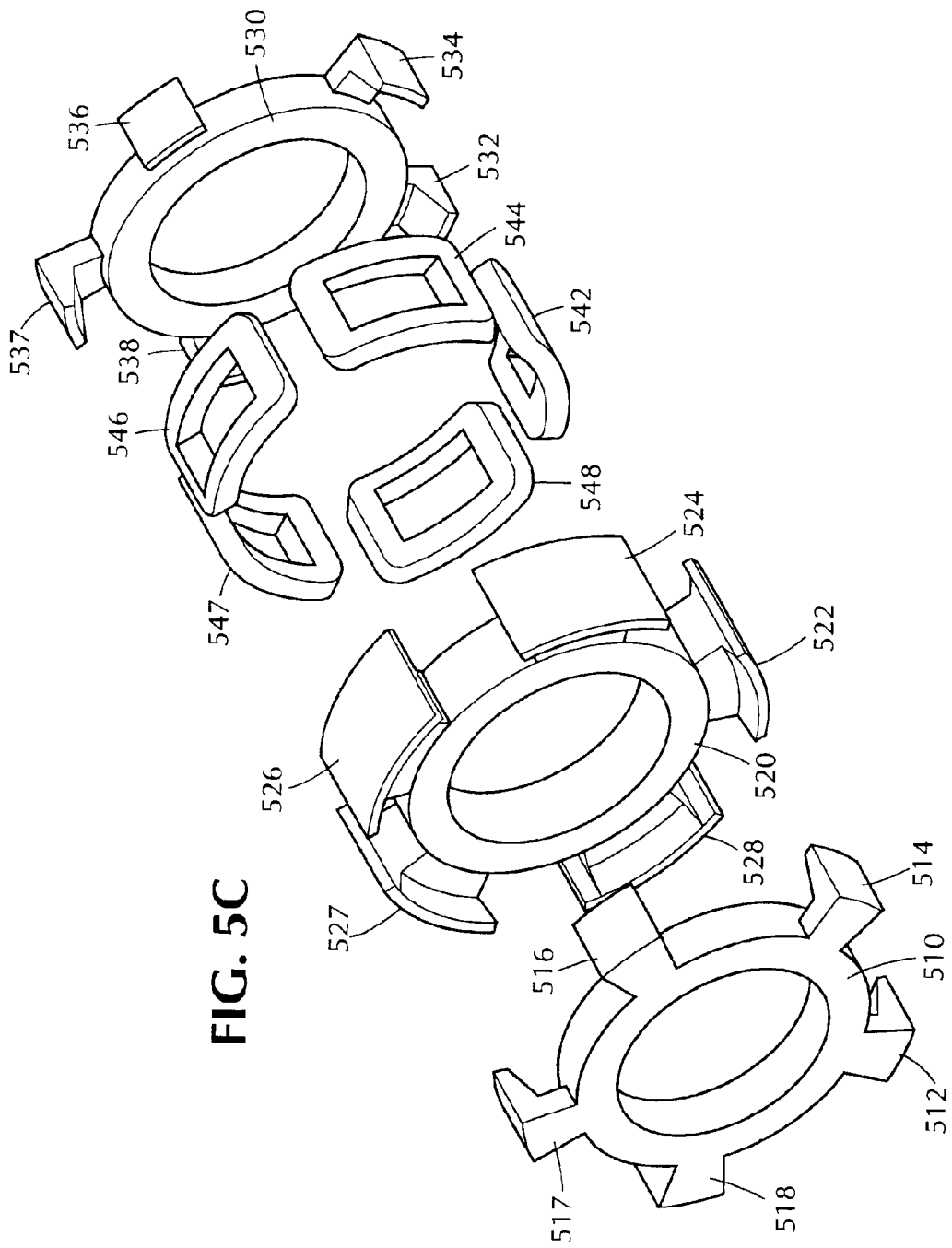
Figure 6A:
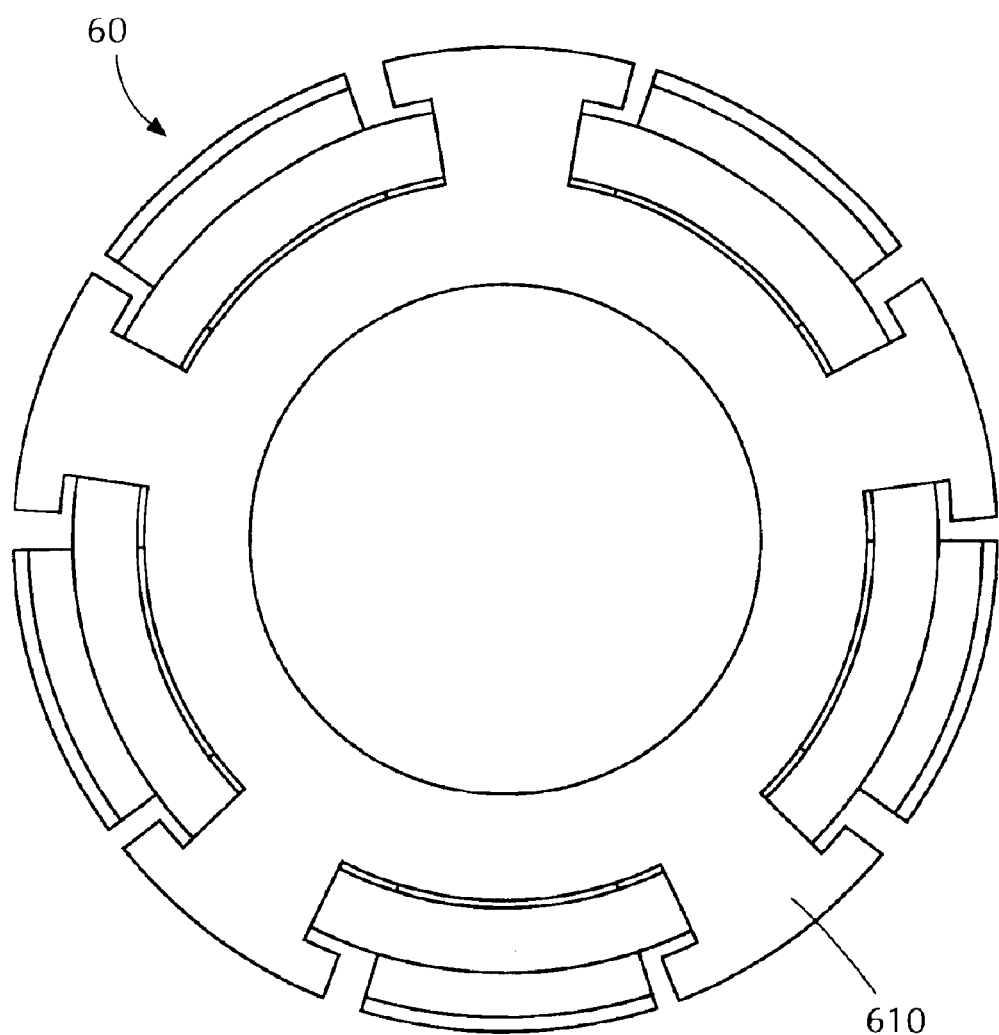
FIGS. 6A, 6B and 6C respectively depict front, assembled and exploded views of an alternative assembly of the structure in FIG. 5, wherein the claws of the central part of the magnetic circuit component are mounted after the installation of the coils and the claws of the lateral parts have also been enlarged to facilitate the mechanical support of the coils, facilitating the mounting of the coils on the central part.

Table IV summarizes a five-coil, five-phase structures with the winding order sequence of the five coils A B C D E. FIGS. 5 and 6 illustrate structures drawn from this table. The magnetic circuit component 50 in FIG. 5 is used with another component (rotor or stator) producing eight magnetic poles in the air gap. The air gap in these embodiments is situated on the outside. As in the case of the embodiment in FIG. 3, the magnetic circuit component 50 of FIG. 5 is made of three annuli 510, 520 and 530, and the coils 542, 544, 546, 547 and 548 are mounted on the base of the claws 522, 524, 426, 527 and 528, respectively of the central annulus 520 (FIG. 5C). The two opposing annuli 510, 530 each has five claws (as shown in FIG. 5C, annulus 510 has claws 512, 514, 516, 517 and 518, and annulus 530 has claws 532, 534, 536, 537 and 538). In this embodiment, the claws of the opposing annuli 510, 530 possess different dimensions to those situated on the central annuli 520 (FIG. 5B). The claws of the lateral annuli 510, 530 extend in a direction perpendicular to the rows of claws when the magnetic circuit is assembled (FIG. 5B).

Figure 6B:
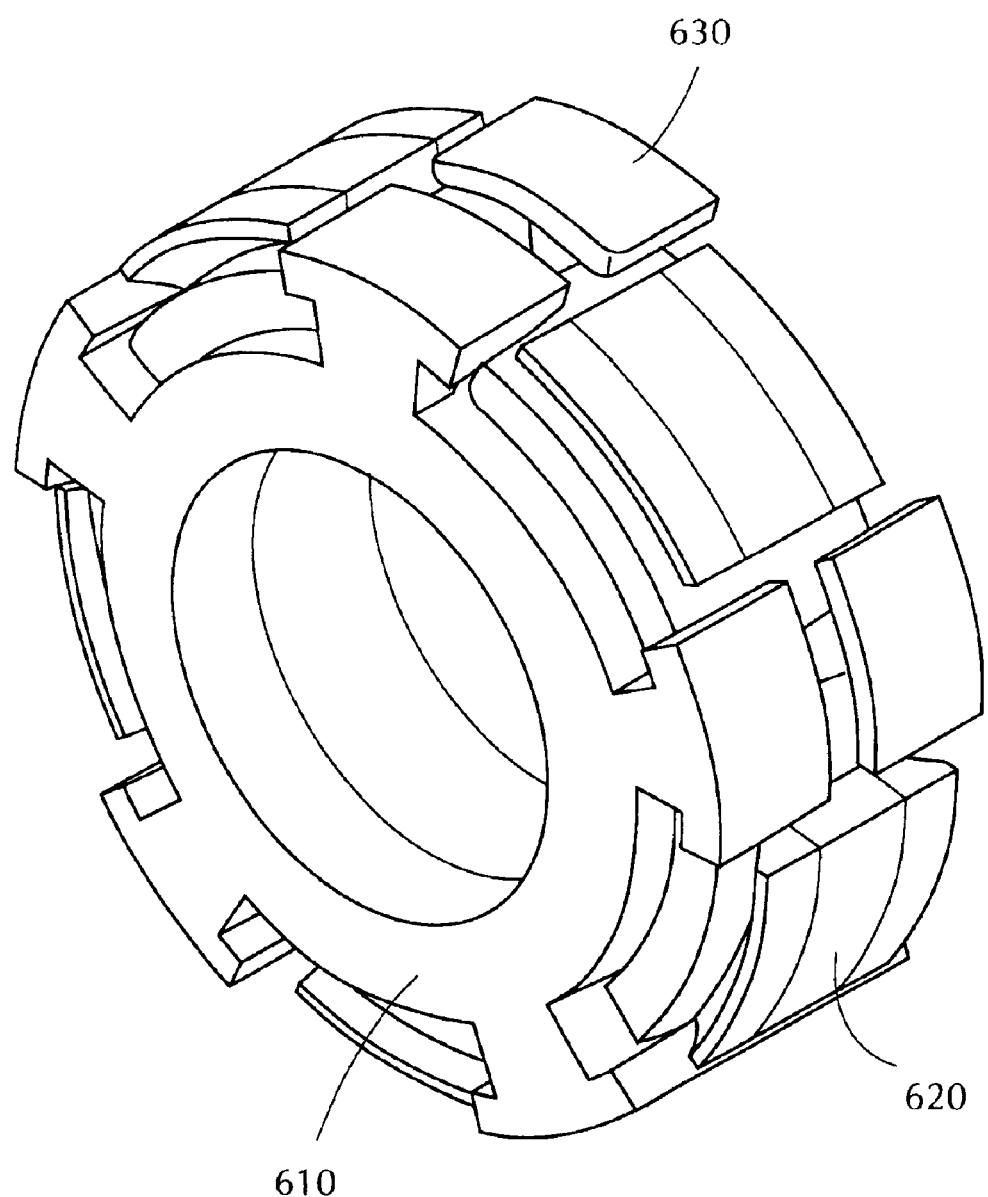
Figure 6C:
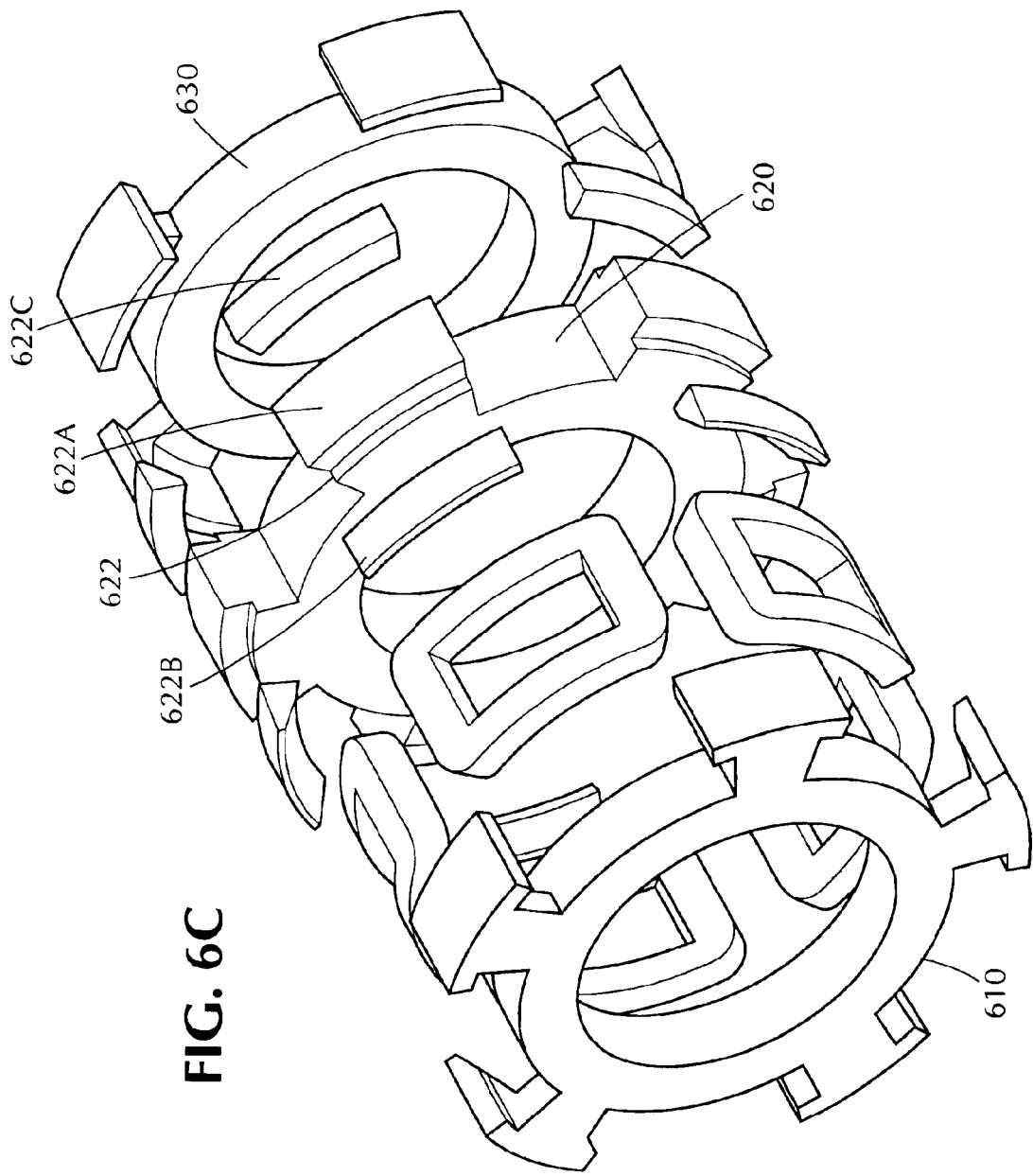

FIG. 6 shows an embodiment in which the top surfaces of the claws on the opposing annuli 610, 630 have been enlarged with respect to their bases, to assist the mechanical seating of the winding. To facilitate the mounting of the coils on the central annulus, the claws on the central annulus are segmented. For example, the top portion of claw pole 622 is divided into three segments: portions 622A, which forms the base of the claw pole; and claw pole extremities 622B and 622C. (FIGS. 6B and 6C). The coils can thus be easily wound on the base. Subsequently, all that is necessary is to assemble the other parts mechanically by gluing or screwing, or pressing or molding these parts of the claws directly on their base, after having mounted the winding.

TABLE 1

Examples of three-phase structures with three coils.

| k1 | Nb | k2 | G1 | k3 | G2 | 2P |
|---|---|---|---|---|---|---|
| 1 | 3 | 1 | 3 | 0 | 3 | 3 < 2P < 9 |
| 1 | 3 | 2 | 6 | −1 | 3 | 6 < 2P < 18 |
| 1 | 3 | 2 | 6 | 0 | 6 | 6 < 2P < 18 |
| 1 | 3 | 3 | 9 | −1 | 6 | 9 < 2P < 27 |
| 1 | 3 | 3 | 9 | 0 | 9 | 9 < 2P < 27 |
| 1 | 3 | 4 | 12 | −1 | 9 | 12 < 2P < 36 |
| 1 | 3 | 4 | 12 | 0 | 12 | 12 < 2P < 36 |

TABLE II

Examples of three-phase structures with six coils.

| k1 | Nb | k2 | G1 | k3 | G2 | 2P |
|---|---|---|---|---|---|---|
| 2 | 6 | 1 | 6 | 0 | 6 | 6 < 2P < 18 |
| 2 | 6 | 2 | 12 | −1 | 6 | 12 < 2P < 36 |
| 2 | 6 | 2 | 12 | 0 | 12 | 12 < 2P < 36 |
| 2 | 6 | 3 | 18 | −1 | 12 | 18 < 2P < 54 |
| 2 | 6 | 3 | 18 | 0 | 18 | 18 < 2P < 54 |
| 2 | 6 | 4 | 24 | −1 | 18 | 24 < 2P < 72 |
| 2 | 6 | 4 | 24 | 0 | 24 | 24 < 2P < 72 |

TABLE III

Examples of two-phase structures with four coils.

| k1 | Nb | k2 | G1 | k3 | G2 | 2P |
|---|---|---|---|---|---|---|
| 2 | 4 | 1 | 4 | 0 | 4 | 4 < 2P < 12 |
| 2 | 4 | 2 | 8 | −1 | 4 | 8 < 2P < 24 |
| 2 | 4 | 2 | 8 | 0 | 8 | 8 < 2P < 24 |
| 2 | 4 | 3 | 12 | −1 | 8 | 12 < 2P < 36 |
| 2 | 4 | 3 | 12 | 0 | 12 | 12 < 2P < 36 |
| 2 | 4 | 4 | 16 | −1 | 12 | 16 < 2P < 48 |
| 2 | 4 | 4 | 16 | 0 | 16 | 16 < 2P < 48 |

TABLE IV

Examples of five-phase structures with five coils.

| k1 | Nb | k2 | G1 | k3 | G2 | 2P |
|---|---|---|---|---|---|---|
| 1 | 5 | 1 | 5 | 0 | 5 | 5 < 2P < 15 |
| 1 | 5 | 2 | 10 | −1 | 5 | 10 < 2P < 30 |
| 1 | 5 | 2 | 10 | 0 | 10 | 10 < 2P < 30 |
| 1 | 5 | 3 | 15 | −1 | 10 | 15 < 2P < 45 |
| 1 | 5 | 3 | 15 | 0 | 15 | 15 < 2P < 45 |
| 1 | 5 | 4 | 12 | −1 | 15 | 20 < 2P < 60 |
| 1 | 5 | 4 | 12 | 0 | 20 | 20 < 2P < 60 |

Figure 4A:
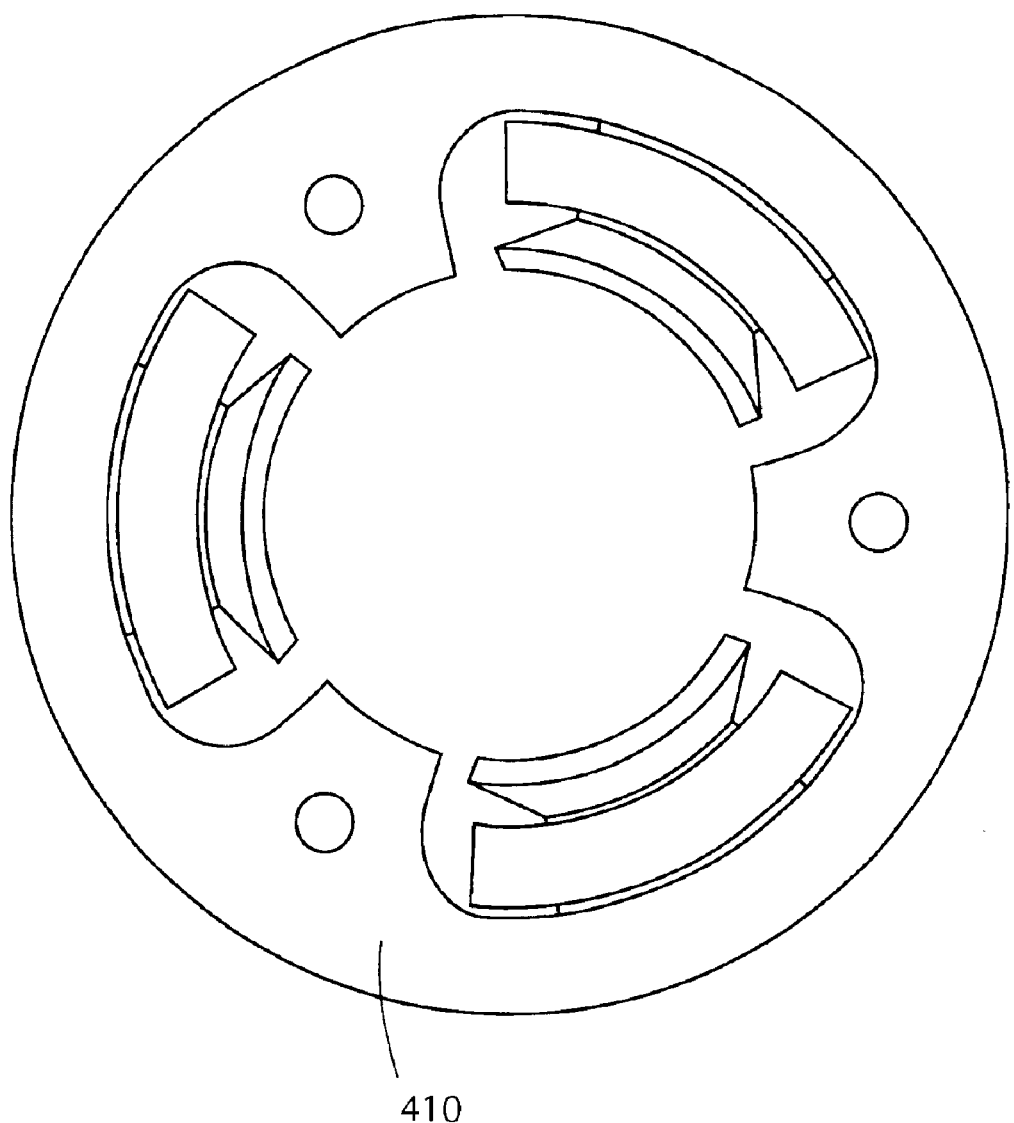
FIGS. 4A, 4B and 4C respectively depict front, assembled and exploded views of an assembly of two of the structures in FIG. 3, whereby the power is increased.
Figure 4B:
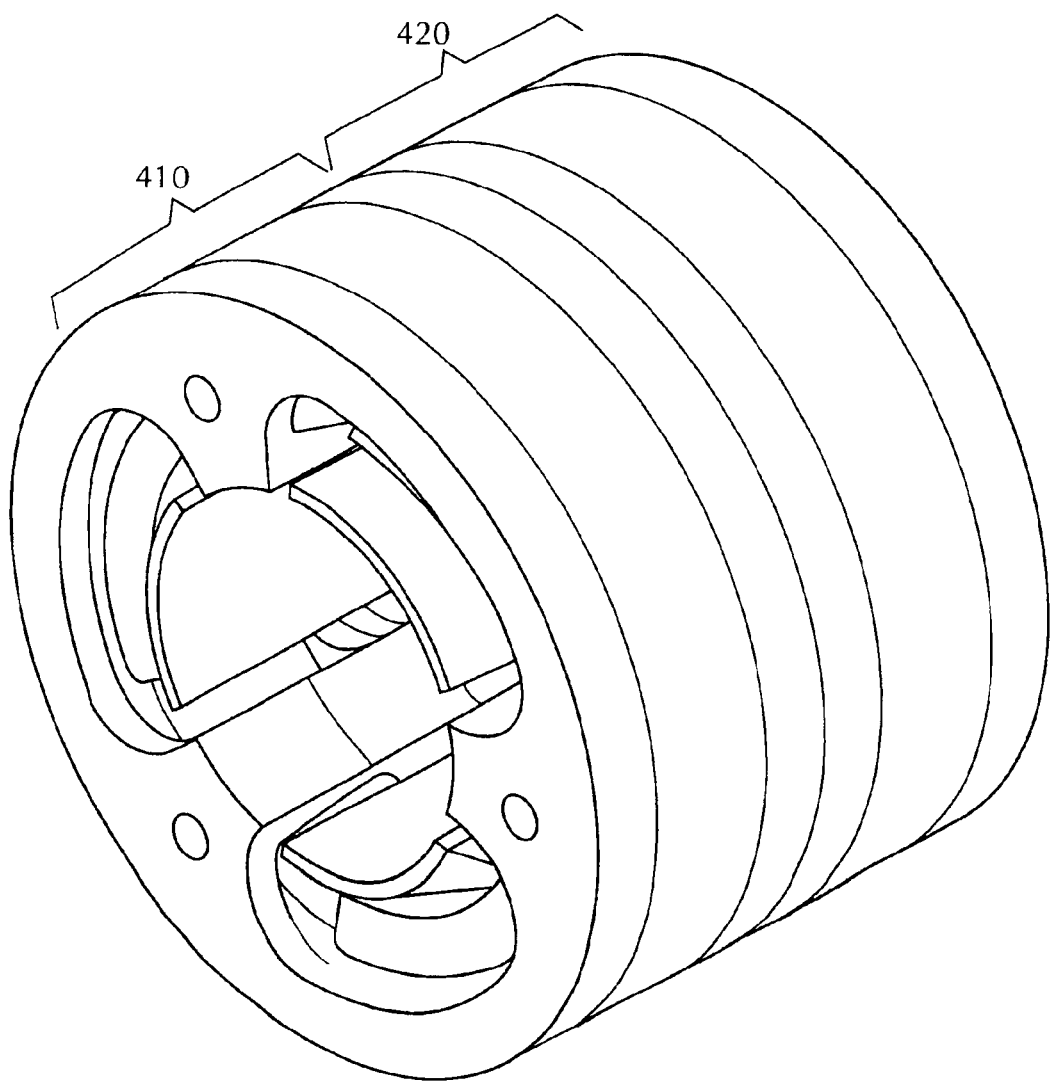
Figure 4C:
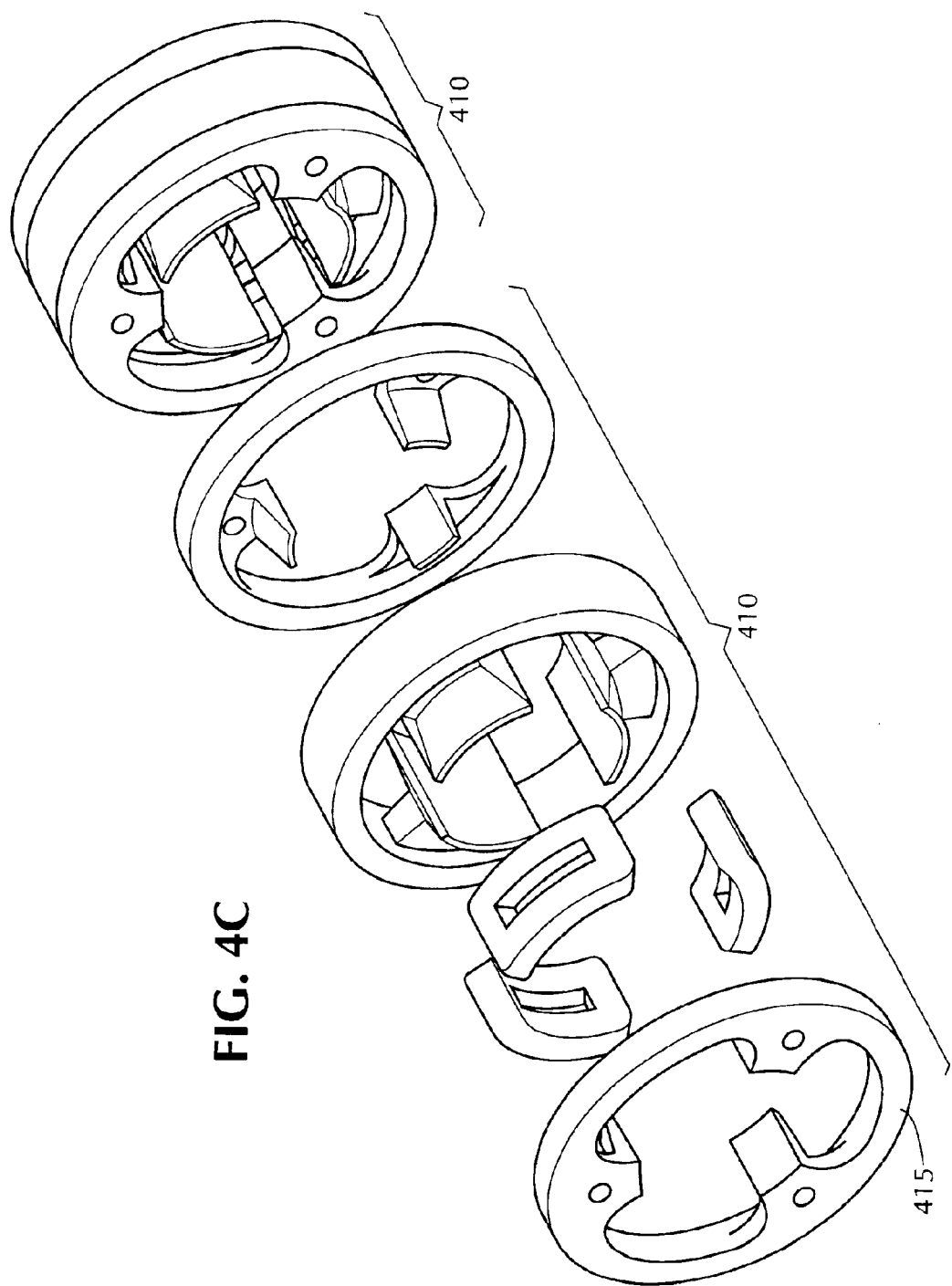

The third embodiment of this invention is illustrated in FIG. 4. To obtain a machine with power two times higher, two identical existing basic structures, 410 and 420, can be used (FIG. 4). The assembly of these two structures can be very simple and avoids the necessity of fabricating new parts. For example, the two identical structures 410, 420 can be directly stacked along the axis of rotation (FIG. 4B), and their windings can be connected in series or in parallel. The mechanical fixation is assured by the lateral pieces 415, 425 of each structure (FIG. 4C). A slight shift can optionally be introduced between the two structures in the direction of motion, to reduce the cogging between phases. Further, to increase the magnetic coupling a space ring (not shown) can optionally be inserted between the two structures. This space ring is made of a magnetic material and is in contact with the yoke of each structure. If the thickness of the ring exceeds the air gap, then the two structures can be significantly shifted in the direction of motion, in order to position two coils of different phase windings under the same magnetic pole of the inductor.

Figure 13A:
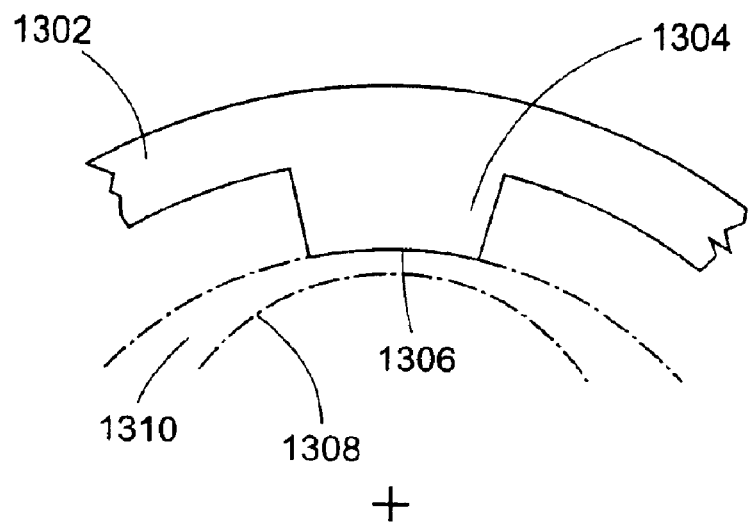
FIG. 13A is a transversal view of a portion of a radial air-gap motor with a claw curvature radius that is different from a rotor curvature radius.

FIG. 13A is a transversal view representing an example of a portion of a radial air-gap motor, including a yoke 1302 and a claw base 1304, wherein a claw curvature radius is different from a (cylindrical, in this example) rotor curvature radius (i.e., a radius of a rotor surface 1308)) in accordance with an aspect of this invention. That is, the curvature radius of a surface (or profile) 1306 of each claw at air gap 1310 is different from the curvature radius of the rotor surface 1308. As such, it can be said that the claws are radially profiled to provide a variable thickness air gap 1310.

Figure 13B:
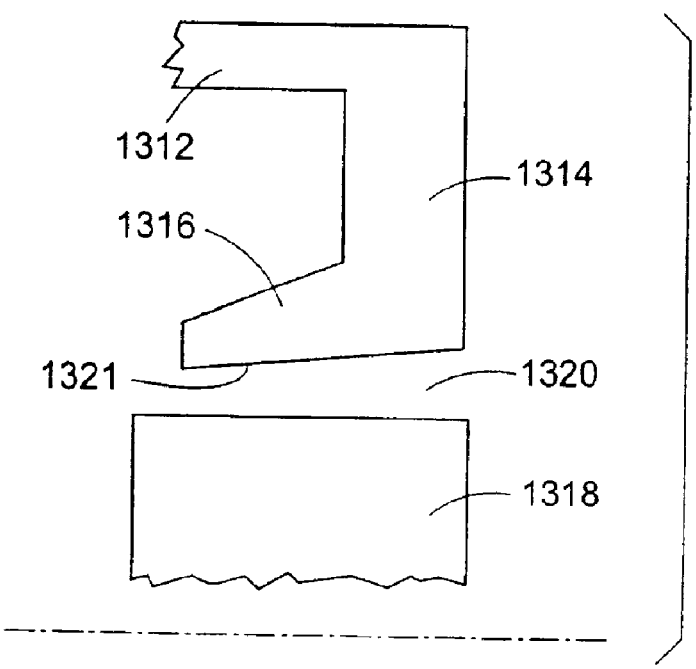
FIG. 13B is a longitudinal view of a portion of a radial air-gap motor having a claw with a modified longitudinal profile adjacent an air gap.

FIG. 13B is a longitudinal view of a portion of a radial air-gap motor with a modified longitudinal profile of claws at air gap 320, according to an aspect of this invention. Represented by way of example is a (cylindrical) rotor 1318, a yoke 1312, a claw base 1314, and a claw 1316 having a longitudinal profile contact surface 1321 adjacent air gap 1320. By virtue of the profile of the contact surface 1321 along a longitudinal direction of the claw 1316, the air gap 1320 has a variable thickness in the longitudinal direction (or the axial direction of the motor).

Figure 14A:
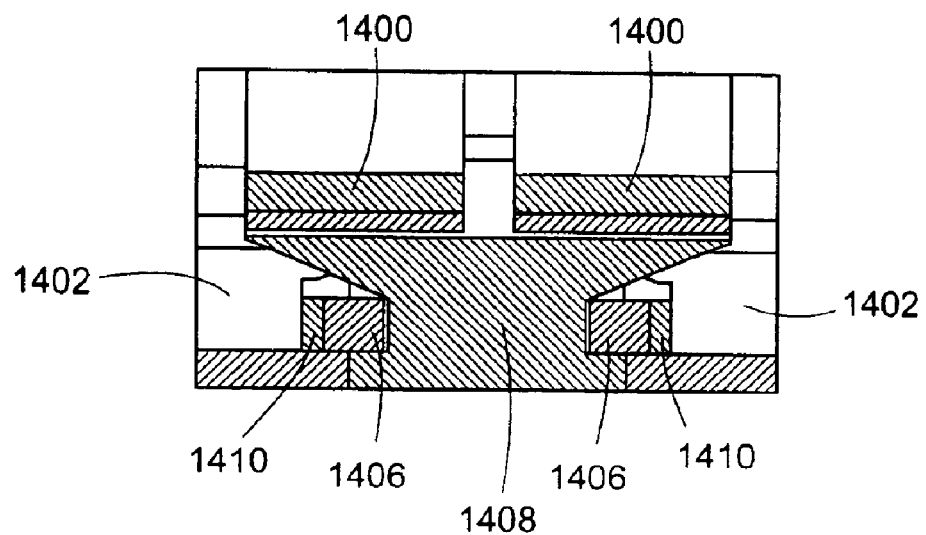
FIG. 14A depicts a cooling system integrated into a stator structure according to one embodiment of the present invention, and FIG. 14B further depicts circular cooling pipes of the system of FIG. 14A.
Figure 14B:
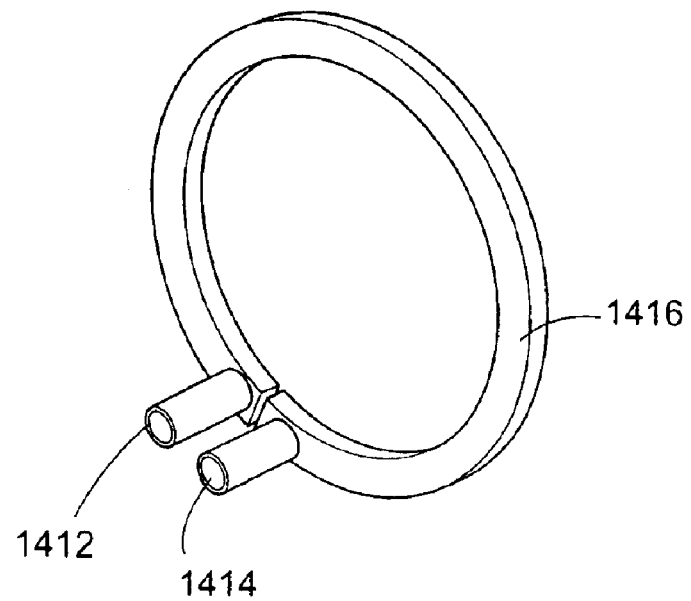

According to another aspect of this invention, an integrated cooling system is provided. For example, FIG. 14A depicts a longitudinal motor section in which circular cooling pipes 1410 (with, e.g., water circulation) are placed in contact with stator coils 1406 of an integrated cooling system, according to one embodiment of the invention. Also shown are a magnetic (stator) lateral part 1402, a magnetic stator central part 1408, and rotor parts 1400. The circular cooling pipes 1410 are further represented in FIG. 14B, wherein an input 1412 and an output 1414 for the cooling liquid are provided, as is a thermal exchange surface 1416 of the pipes 1410.

Figure 15A:
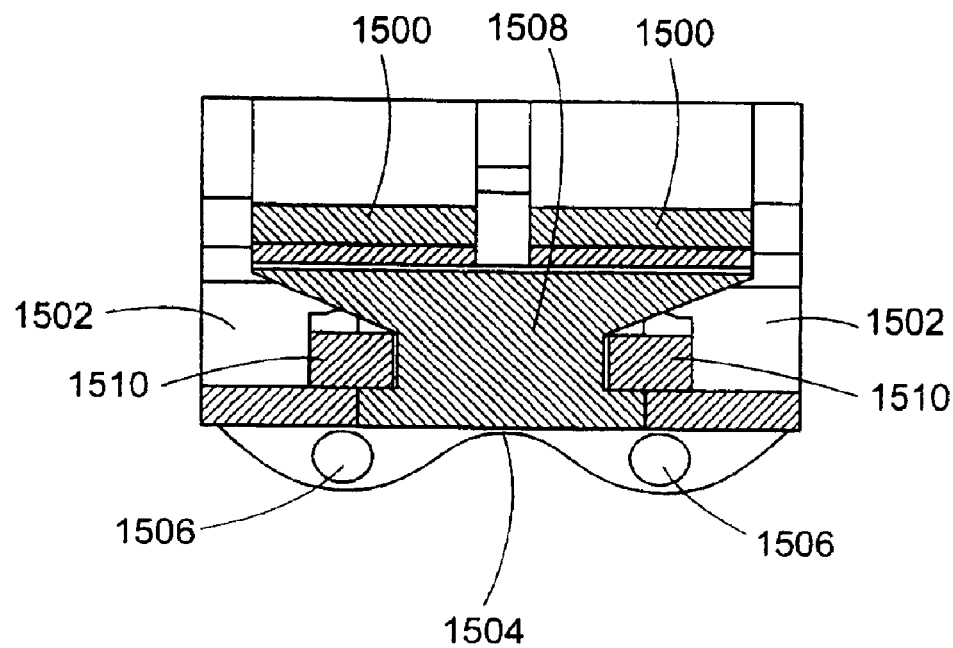
FIG. 15A depicts a cooling system integrated in a magnetic circuit of a stator, according to another embodiment of the present invention, and FIGS. 15B and 15C further depict a stator equipped with a sidewall and a skirt integrated in the stator magnetic circuit.
Figure 15B:
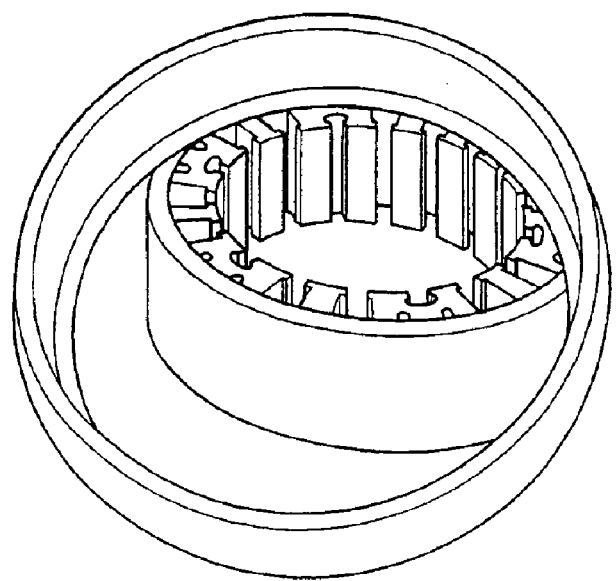
Figure 15C:
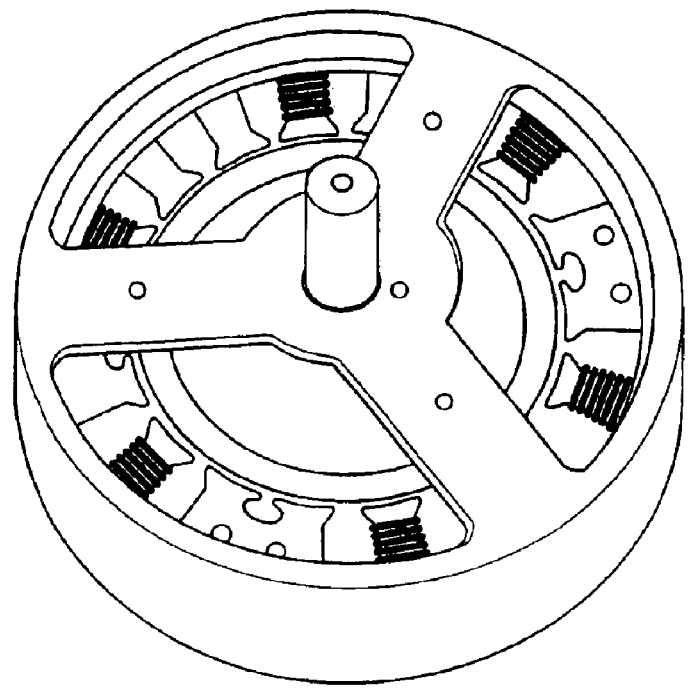
Figure 16:
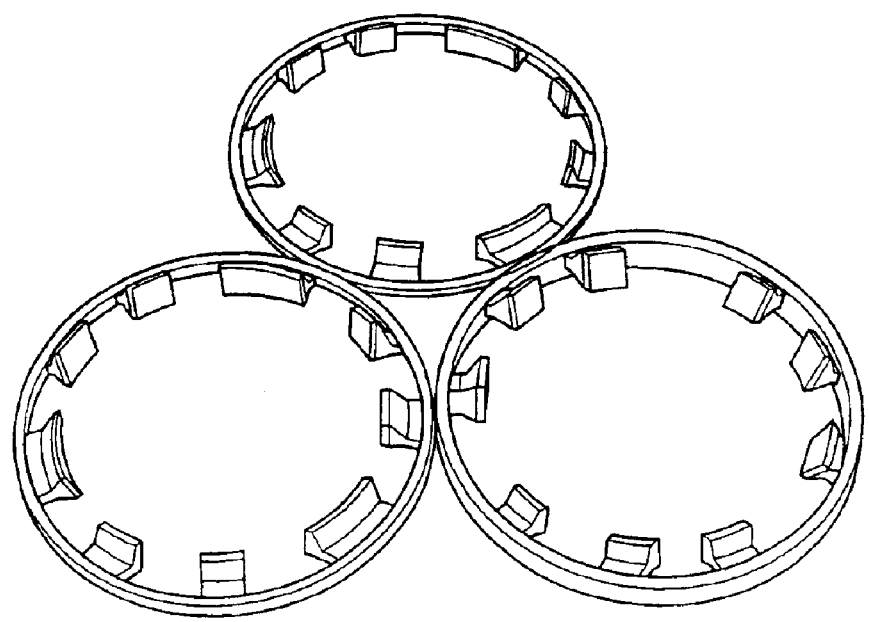
FIG. 16 shows separate segments and rows of claws according to this invention.
Figure 17:
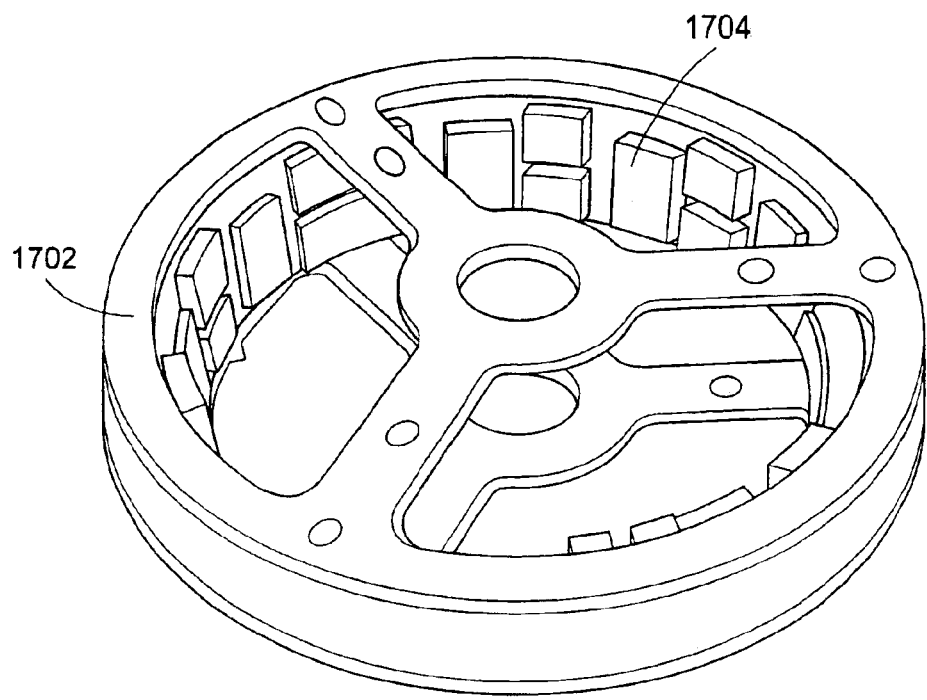
FIG. 17 represents an assembly of separate segments according to the invention, where two opposing segments are assembled with flanges or bars 1702 made of a non-magnetic material, and including a support 1704 for a bearing housing.
Figure 18:
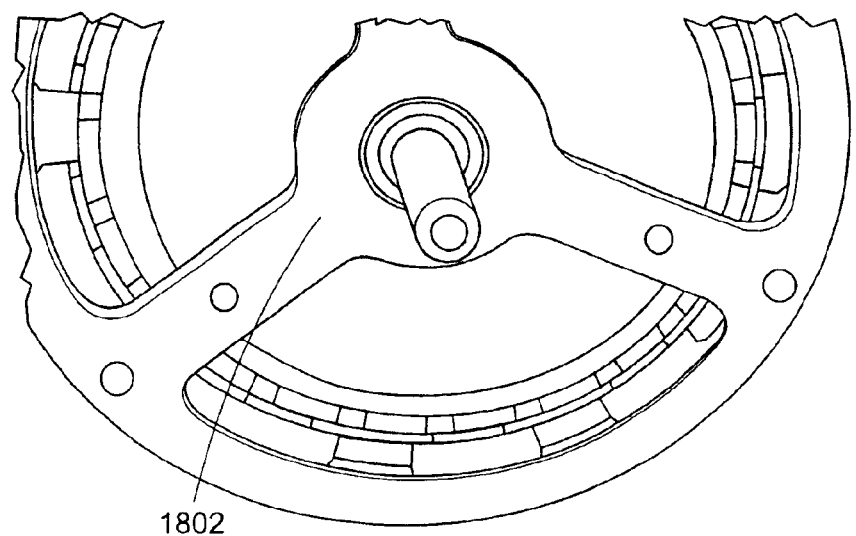
FIG. 18 further represents a bearing housing 1802.
Figure 19A:
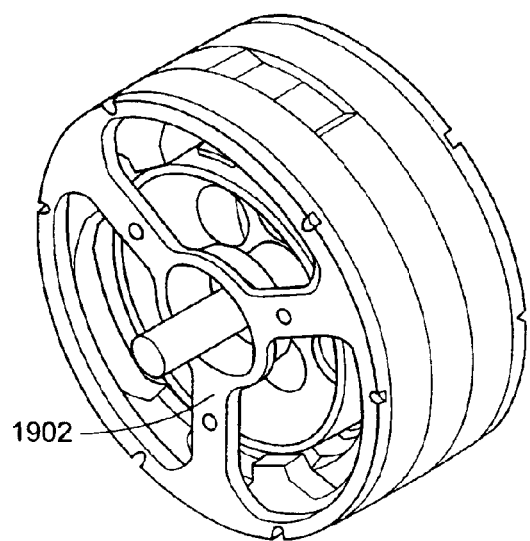
FIGS. 19A and 19B represent an assembly of a magnetic circuit and an exploded or disassembled representation thereof, respectively, including non-magnetic flanges 1902.
Figure 19B:
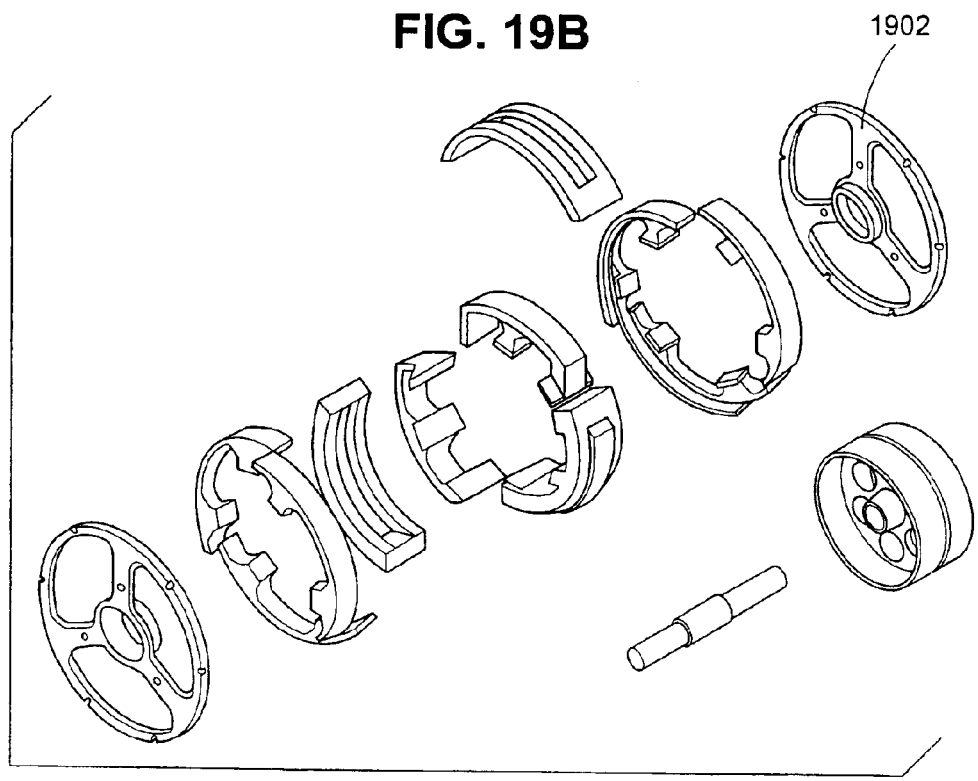

According to another embodiment of an integrated cooling system of the invention, cooling pipes (with, e.g., water circulation) are integrated in a magnetic circuit of a stator. As an example, FIG. 15A depicts a longitudinal motor section having a cooling system integrated in a magnetic circuit of a stator. Depicted are cooling pipes 1506, coils 1510, a magnetic (stator) lateral parts 1502, rotor parts 1500, a magnetic stator central part 1508, and a sidewall 1504 integrated in the stator magnetic circuit. FIGS. 15B and 15C further depict a stator equipped with a sidewall and a skirt integrated in the stator magnetic circuit.

While only some embodiments of the present invention are described above, it is obvious that several modifications or simplifications are possible without departing from the spirit of the present invention.

We claim:

1. A magnetic circuit component for use as a moving or stationary armature of an electrical machine, the magnetic circuit component for magnetic coupling to an inductor having poles alternatively magnetized North-South in a direction of motion, where the inductor is separated from the magnetic circuit component by an air gap, the magnetic circuit component comprising:

a plurality of claws, the claws arranged in a plurality of rows, a base of each claw in a same row connected to a common yoke; and a multi-phase winding comprising a plurality of non-interlaced coils, each coil wound on the base of at least one corresponding claw, but not wound around the bases of all of the plurality of claws, and not wound around claws of different rows, the coils being distributed uniformly in the direction of motion.

2. The magnetic circuit component of claim 1, having the following characteristics:

$$Mph > 1$$
$$Nb = k1.Mph \quad k1 \text{ is an integer greater than } 0;$$
$$G1 = k2.Nb \quad k2 \text{ is an integer greater than } 0;$$
$$G2 = G1 + k3.Nb \quad k3 \text{ is an integer equal to } -1 \text{ or equal to } 0;$$
$$G2 > 0$$
$$G1 < 2P < 3.G1$$

where Nb is a total number of coils, which are regularly spaced along at least one claw row, G1 is a total number of claws on a part which has a winding, G2 is a total number of claws in an adjacent part, which has no winding, Mph is a total number of phases of the winding, and P represents a number of pairs of magnetic poles produced by the inductor, and wherein a coil arrangement on the armature follows a successive phase sequence order in the direction of motion and a same sequence is repeated several times when each phase has several coils.

3. A magnetic circuit component according to claim 1, wherein the magnetic circuit component is made at least in part from laminated magnetic material formed by punching or machining.

4. A magnetic circuit component according to claim 1, wherein an outer surface of each claw facing the air gap forms a rectangular, triangular or trapezoidal shape.

5. A magnetic circuit component according to claim 1, wherein each of at least some of the claws has at least one slot opening formed therein exposing the common yoke to the air gap.

6. A magnetic circuit component according to claim 1, wherein at least some of the claws have a contact surface with a predetermined curvature radius such that the air gap adjacent the contact surface differs in thickness from that not adjacent to the contact surface.

7. A magnetic circuit component according to claim 1, wherein at least some of the claws have respective surfaces adjacent the air gap which are enlarged with respect to their corresponding bases in different directions.

8. A magnetic circuit component according to claim 1, wherein the bases of the claws possess rectangular, oval or circular sections with rounded sides or corners.

9. A magnetic circuit component according to claim 1, equipped with a cooling system realized with pipes or passages made of a non magnetic material for circulation of a cooling fluid, the pipes being proximate to at least one of the coils and oriented parallel to a row of the claws.

10. A magnetic circuit component according to claim 1, wherein each row of claws comprises a separate segment, and wherein two opposing segments are assembled with flanges or bars made of a non-magnetic material, the flanges or bars further configured to support bearing housings, to form an electric machine with reduced axial length.

11. A magnetic circuit component according to claim 1, wherein the claws extend from an inner-facing surface of the common yoke, adjacent the air gap.

12. A magnetic circuit component according to claim 1, wherein the claws extend from an outer-facing surface of the common yoke, adjacent the air gap.

13. A magnetic circuit component according to claim 1, wherein at least a portion of the common yoke forms a substantially annular shape.

14. A magnetic circuit component according to claim 1, wherein the claws of at least one of the rows are irregularly distributed.

15. A magnetic circuit component according to claim 1, wherein an outer surface of the magnetic circuit component includes cooling fins.

16. A magnetic circuit component according to claim 1, wherein a number of the claws in each row is a multiple of a number of phases of the electrical machine.

17. A magnetic circuit component according to claim 1, wherein predetermined ones of the claws have a greater contact surface with the air gap than do other predetermined ones of the claws.

18. A magnetic circuit component according to claim 1, wherein at least some of the claws have a contact surface with the air gap, and the contact surface is oriented such that the air gap has a varying thickness along the contact surface.

19. The magnetic circuit component according to claim 1, wherein the magnetic circuit component is made from a plurality of segments, each having a corresponding one of the rows of claws.

20. The magnetic circuit component according to claim 19, wherein the magnetic circuit component comprises three segments fastened together, each segment containing a corresponding one of the rows of claws, wherein the coils are mounted on a central one of the three segments and two opposing ones of the segments are identical.

21. A magnetic circuit component according to claim 20, wherein the central segment is formed by plural separate and substantially identically shaped structural parts, to facilitate the mounting of the coils, and wherein the structural parts of the central segment are retained in position by fastening the two opposing segments.

22. An electrical machine comprising a plurality of magnetic circuit components, each being a magnetic circuit component according to claim 19, wherein the magnetic circuit components are stacked along their axes of rotation.

23. The electrical machine according to claim 22, wherein the plurality of magnetic circuit components are directly assembled together.

24. The electrical machinery according to claim 22, wherein two of the magnetic circuit components have a spacing ring positioned between them, the spacing ring fabricated from a magnetic material.

25. A magnetic circuit component according to claim 1, wherein the magnetic circuit component is made at least in part from composite magnetic material of metal powder formed by pressing, molding or machining.

26. A magnetic circuit component according to claim 25, further including an integral cooling system made of composite magnetic materials.

27. A magnetic circuit compound according to claim 26, wherein the integral cooling system comprises composite magnetic material defining passages for circulation of a cooling fluid.

28. A magnetic circuit component according to claim 25, further comprising a mechanical fixation system for bearings or position sensors, integrated into opposing segments of the magnetic circuit component, and made of composite magnetic material.

29. A magnetic circuit component for use as a moving or stationary armature of an electrical machine, the magnetic circuit component for magnetic coupling to an inductor separated from the magnetic circuit component by an air gap, the magnetic circuit component comprising:

a common yoke;

plural rows of claws extending from the common yoke; and plural electrical coils, each being wound around a base of at least one claw, but not wound around bases of all plural claws, and not wound around claws of different rows, the coils being distributed uniformly in a direction of motion of the magnetic circuit component.

30. A magnetic circuit component according to claim 29, wherein a number of the claws in each row is a multiple of a number of phases of the electrical machine.

31. A magnetic circuit component according to claim 29, wherein the common yoke includes plural yoke segments, and wherein from each yoke segment extends one of the rows of claws.

32. An electrical machine comprising a plurality of magnetic circuit components, each being a magnetic circuit component according to claim 31, wherein the magnetic circuit components are stacked along their axes of rotation.

33. A magnetic circuit component according to claim 29, wherein at least two of the claws have a same base.

34. A magnetic circuit component according to claim 29, wherein the common yoke has a substantially annular shape.

35. A magnetic circuit component according to claim 34, wherein the claws extend from a circumferential surface of the common yoke.

36. A magnetic circuit component according to claim 35, wherein the circumferential surface faces inwardly from the magnetic circuit component, towards the air gap.

37. A magnetic circuit component according to claim 35, wherein the circumferential surface faces outwardly from the magnetic circuit component, towards the air gap.

38. A magnetic circuit component according to claim 29, wherein the claws of at least one of the rows are irregularly distributed.

39. A magnetic circuit component according to claim 29, wherein an outer surface of the magnetic circuit component includes cooling fins.

40. A magnetic circuit component according to claim 29, wherein at least some of the claws have a slot formed therein, exposing the common yoke to the air gap.

* * * * *